United States Patent

Ohtsuka et al.

[11] Patent Number: 5,771,141
[45] Date of Patent: Jun. 23, 1998

[54] MAGNETORESISTIVE HEAD AND MAGNETIC RECORDING/REPRODUCING APPARATUS

[75] Inventors: Yoshinori Ohtsuka; Takao Koshikawa; Yoshifumi Mizoshita; Yuji Uehara; Eiichi Kanda; Ken-ichi Aoshima; Hitoshi Kanai; Junichi Kane, all of Kanagawa, Japan

[73] Assignee: Fujitsu Limited, Kawasaki, Japan

[21] Appl. No.: 766,511

[22] Filed: Dec. 13, 1996

[30] Foreign Application Priority Data

Apr. 26, 1996 [JP] Japan ................................. 8-106933

[51] Int. Cl.[6] .................................................. G11B 5/39
[52] U.S. Cl. ............................................................ 360/113
[58] Field of Search ............................................. 360/113

[56] References Cited

U.S. PATENT DOCUMENTS

| | | | |
|---|---|---|---|
| 5,420,736 | 5/1995 | Heim et al. | 360/113 |
| 5,436,778 | 7/1995 | Lin et al. | 360/113 |
| 5,557,491 | 9/1996 | Gill et al. | 360/113 |

FOREIGN PATENT DOCUMENTS

| | | |
|---|---|---|
| 58-83322 | 5/1993 | Japan . |
| 64831 | 1/1994 | Japan . |

Primary Examiner—Roberts S. Tupper
Attorney, Agent, or Firm—Greer, Burns & Crain, Ltd.

[57] ABSTRACT

A magnetoresistive head comprises a magnetoresistive layer having an axis of easy magnetization in the direction parallel to an air bearing surface, a first electrode formed on the magnetoresistive layer on the air bearing surface side and an oblique side portion with respect to the air bearing surface, and a second electrode formed to be separated at a distance from the first electrode and having a side portion substantially parallel to the oblique side portion of the first electrode on the magnetoresistive layer.

12 Claims, 19 Drawing Sheets

ABS

FIG.15A
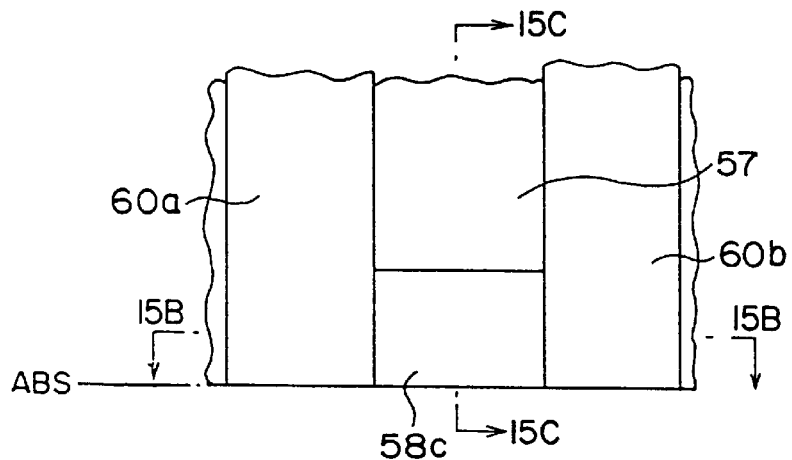
FIG.15B
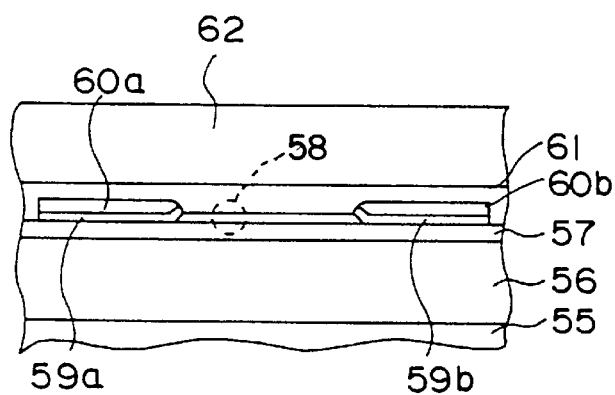
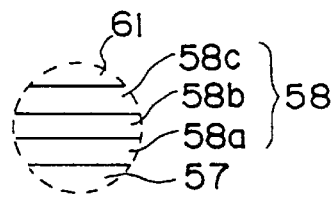
FIG. 15D
FIG.15C
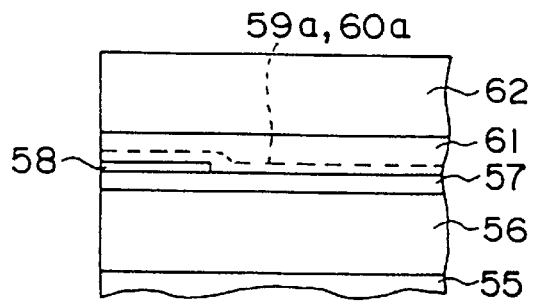

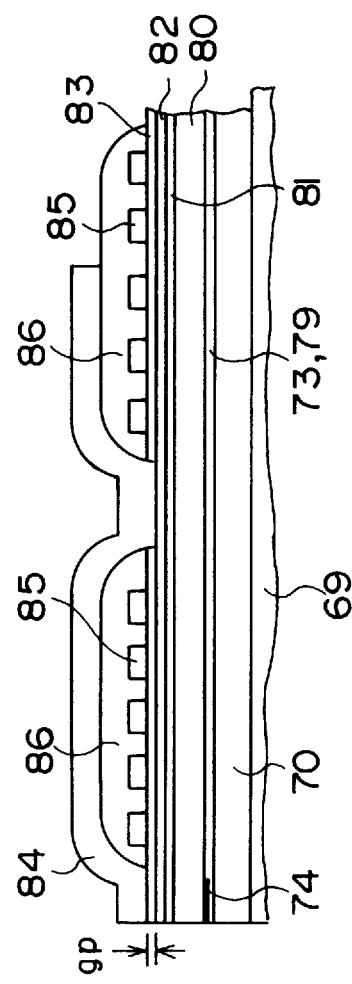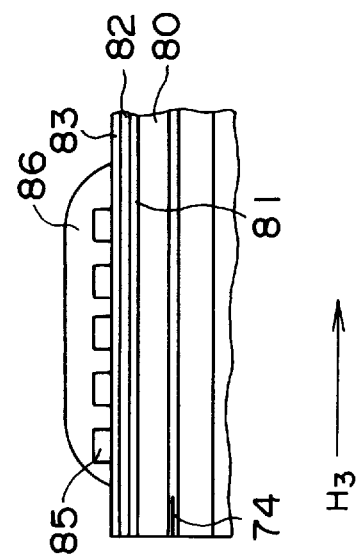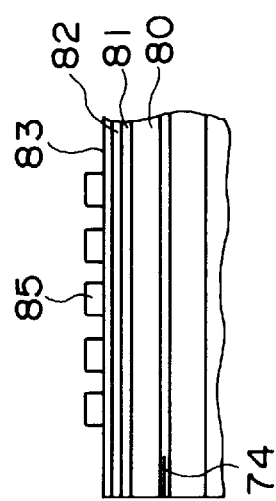

MAGNETORESISTIVE HEAD AND MAGNETIC RECORDING/REPRODUCING APPARATUS

BACKGROUND OF THE INVENTION

1. Field of the Invention

The present invention relates to a magnetoresistive head and a magnetic recording/reproducing apparatus and, more particularly, to a magnetic recording/reproducing apparatus such as magnetic disk drive, magnetic tape unit, etc. and a magnetoresistive head for use in such magnetic recording apparatus.

2. Description of the Prior Art

With the progress of miniaturization and capacity increase of the magnetic disk drive, higher performance is required of the magnetic head. As the read only magnetic head satisfying this requirement, such a magnetoresistive head (referred to as a "MR head" hereinafter) has been observed with interest that can be operated irrespective of a rotational speed of the magnetic disk, can also be applied to the small size magnetic disk, and can in addition achieve higher output.

As the MR head, there are AMR (amorphous MR) head using magnetizing bias conductive layers, spin valve MR head, giant MR head, and the like.

In the AMR head using the magnetizing bias conductive layers, such a structure is as a rule utilized that part of the MR layer and the lead terminals are exposed on the opposing surface side to the magnetic recording medium. In the event that the MR head having such structure is fitted to a flying type slider, when a flying height of the flying type slider is reduced, it is prone to cause an electrical shortcircuit and/or a discharge between the MR head and the magnetic recording medium. As a result, it is feared that the magnetic head will be damaged.

As the magnetic head with the structure which is able to overcome such disadvantages, such a magnetic head has been set forth in Patent Application Publication (KOKAI) 63-23217, for instance, that the MR layer is arranged so as to flow sense current in the same direction as the signal magnetic field and only the grounding leading terminal is exposed on the opposing surface side to the magnetic recording medium. The MR head with such structure is called a "vertical AMR head" hereinafter.

As another example of the magnetic head, as shown in FIG.1, the MR head has been set forth in U.S. Pat. No. 5420736, wherein first to third terminals 102 to 104 are connected to an MR layer 101 and the first terminal 102 is set at ground potential and exposed to an opposing surface to the magnetic recording medium (referred also to as an "air bearing surface" hereinafter). In the AMR head 101, a triangular projection 102a is formed on the first terminal 102 and the second and third terminals 103 and 104 are formed so as to oppose oblique sides of the triangular projection 102a. In addition, an axis of easy magnetization M of the MR layer 101 is controlled by a hard magnetic layer 105 to direct in the direction parallel to the surface of the magnetic recording medium.

The three-terminal AMR head and the vertical AMR head described above are particularly effectual in the contact area to the magnetic recording medium since the grounded electrode is positioned near the magnetic recording medium.

The AMR head with three-terminal structure can suppress thermal asperity if the second and third terminals 103 and 104 (and not the first terminal 102) are connected to a differential amplifier 106. The thermal asperity is defined as a phenomenon such that, if the MR device collides with the projection or extraneous substance on the surface of the magnetic recording medium, device resistance is increased due to heat generation by means of collision energy so that fluctuation in the base line of reproduced signals is caused to thus fluctuate reproduced outputs. The thermal asperity has been recited in, R. L. Galbraith, G. J. Kerwin, J. M. Poss, "Magneto-Resistive Head Thermal Asperity Digital Compensation", IEEE Trans. on Mag., Vol. 28, No. 5, 1992.

The vertical AMR head is complicated in structure since the terminal for passing through sense current and the terminal for generating the bias magnetic field are provided individually.

The AMR head with three-terminal structure can be formed with the aid of fewer layers since the conductor layer used for generating the bias magnetic field can be omitted. However, because of substantially constant resistance distribution in the first terminal 102', current flowing from the second and third terminals 103 and 104 into the first terminal 102 spread substantially uniformly in the radial direction. Therefore, since various magnetization directions are present in the MR layer at a plurality of angles relative to the current flowing direction, it is difficult to attain high sensitivity by such AMR head. Furthermore, because two MR devices are employed substantially in the AMR head with three-terminal structure, the number of leading wirings is increased to thus complicate the circuit structure.

SUMMARY OF THE INVENTION

The present invention has been made in view of the above problems, and it is an object of the present invention to provide a magnetoresistive head which can to obtain reproducing output with higher sensitivity and without increasing the number of terminals and a magnetic recording/reproducing unit using such magnetoresistive head.

According to the magnetoresistive head of the present invention, the first electrode and the second electrode are formed on the magnetoresistive layer in parallel to put the sense region therebetween. The first electrode is arranged near the magnetic recording medium and has an oblique side on the second electrode side. Thus, the first electrode is wide in width on one side of the sense region and narrow in width on the other side of the sense region.

Therefore, it is difficult for the current flowing the sense region of the magnetoresistive layer to spread radially since the current flowing through between the first electrode and the second electrode becomes easy to flow into the narrow region of the first electrode.

If the direction of the current flowing between the first electrode and the second electrode is set, for instance, at angles of 45 degree respectively relative to the axis of easy magnetization of the magnetoresistive layer and the applied direction of the signal magnetic field, electric resistance caused by the signal magnetic field changes linearly and rate of resistance change is increased. The direction of the axis of easy magnetization can be controlled with the aid of the hard magnetic layers or antiferromagnetic layers formed on both sides of the sense region.

If the first electrode is retained at a potential identical to the magnetic recording medium, for example, discharge or short-circuit due to potential difference between the first electrode and the magnetic recording medium can be avoided, and damage of the magnetic head can be prevented.

In addition, since the shielding layer in the magnetic head is in general set to substantially identical potential to the magnetic recording medium, the first electrode can be set to potential identical to the magnetic recording medium if the first electrode is electrically connected to the shielding layer.

As a structure for conductively connecting the first electrode to the shielding layer, there is a structure wherein a nonmagnetic conductive film is formed on the surface opposing the magnetic recording medium so as to cover the first electrode and the shielding layer, which are both exposed to the surface opposing the magnetic recording medium, otherwise a structure wherein the first electrode is passed through the insulating layer to be contacted with the shielding layer by forming a thickness of the first electrode thick rather than the second electrode.

On the contrary, if the second electrode is formed wider, it is feared that the current passing from the second electrode to the first electrode may be spread in a radial manner. Therefore, it is preferable that a width of the second electrode is designed not to be wider than the sense region of the magnetoresistive layer.

Such magnetic head may be employed, for instance, in the magnetic disk drive, and the magnetic tape unit.

BRIEF DESCRIPTION OF THE DRAWINGS

FIG.15A is a plan view showing a magnetoresistive device in a magnetic head according to a fourth embodiment of the present invention;

FIG.15B is a sectional view showing the magnetoresistive device along a line IV—IV in FIG.15A;

FIG.15C is a sectional view showing the magnetoresistive device along a line V—V in FIG.15A;

FIG.31A is a sectional view showing the magnetic head according to the fifth embodiment of the present invention;

FIG.31B is a sectional view showing formation of a coil in the inductive type head; and FIG.31C is a sectional view showing an insulating layer covering the coil in the inductive type head.

DESCRIPTION OF THE PREFERRED EMBODIMENTS

Figure 1:
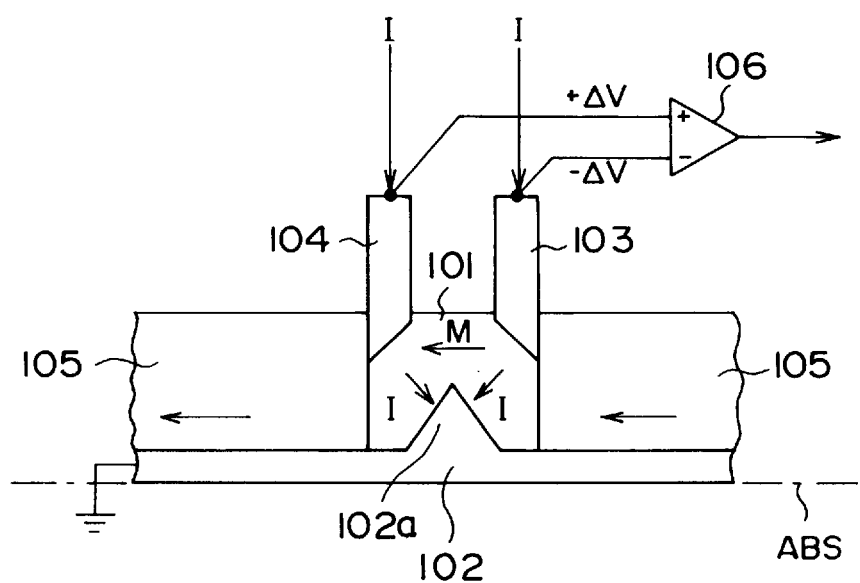
FIG.1 is a plan view showing an example of the conventional MR device.
Figure 2:
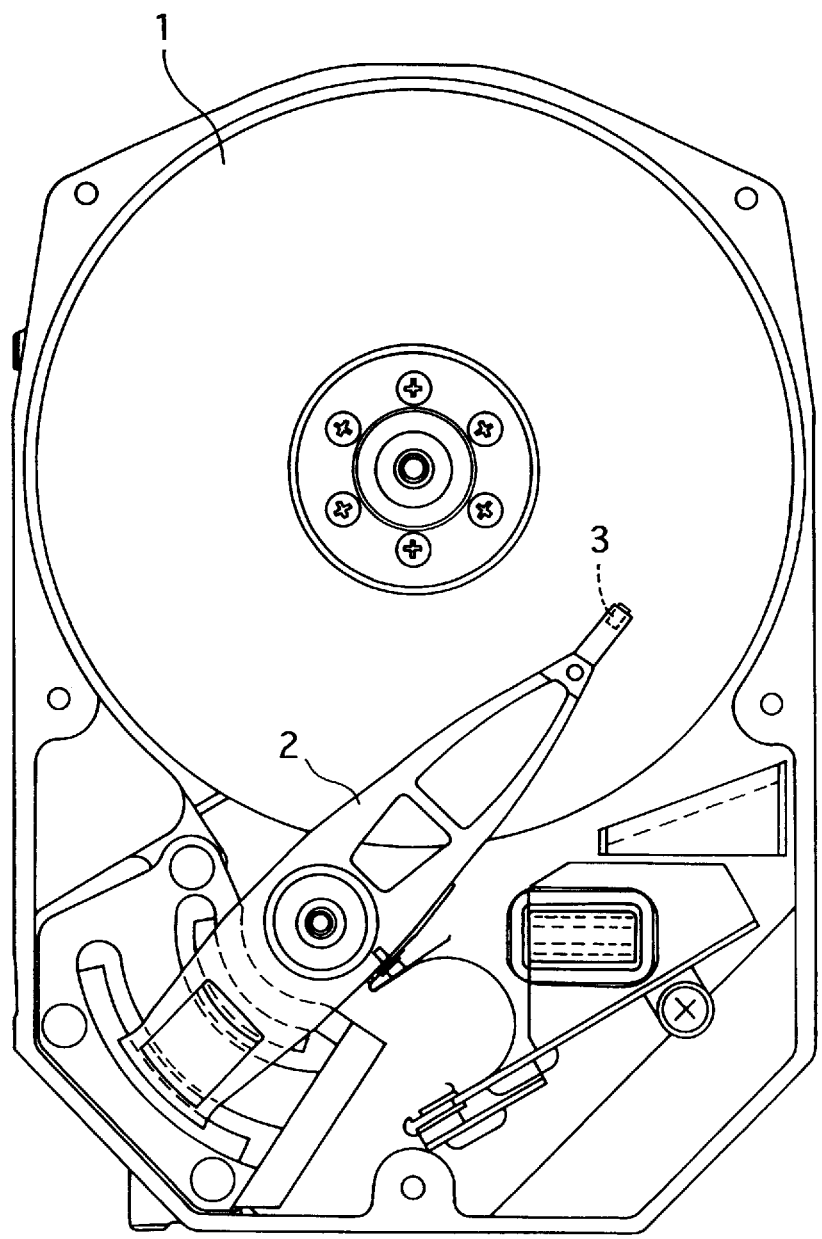
FIG.2 is a plan view showing an inside of a magnetic disk drive to which embodiments of the present invention are applied.

A magnetic head of the present invention explained hereinafter will be applied to a magnetic disk drive shown in FIG.2 or a magnetic tape unit (not shown), for instance. In FIG.2, the magnetic disk drive comprises a magnetic disk 1 having a magnetic recording medium layer (not shown), a suspension 2 being moved on the magnetic disk 1, and a slider 3 attached to a top end of the suspension (arm)2. A read/write magnetic head described later is attached to the slider 3.

Accordingly, preferred embodiments of magnetic heads of the present invention will be explained in detail hereinafter.

First Embodiment

Figure 3A:
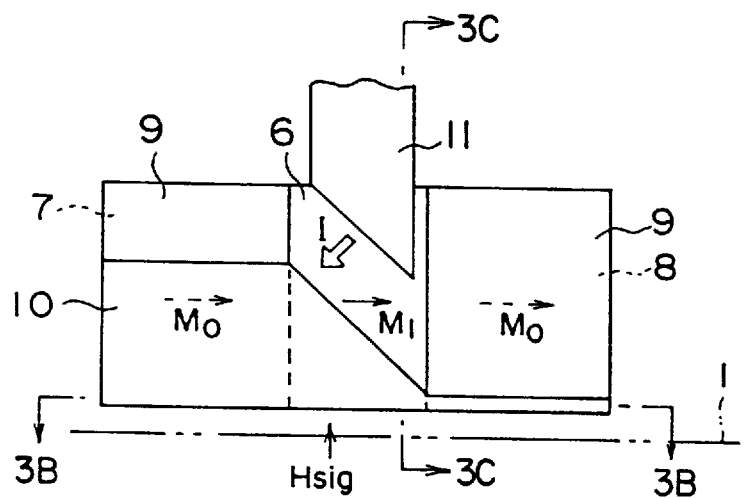
FIG.3A is a plan view showing an MR head according to a first embodiment of the present invention.
Figure 3B:
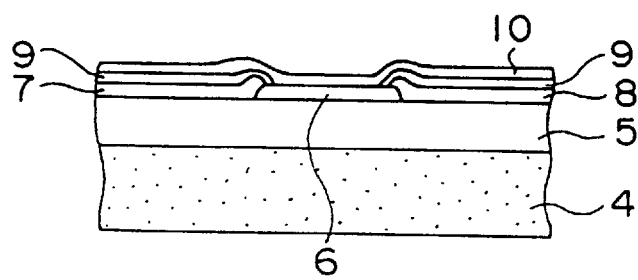
FIG.3B is a sectional view showing the MR head along a line I—I in FIG.3A.
Figure 3C:
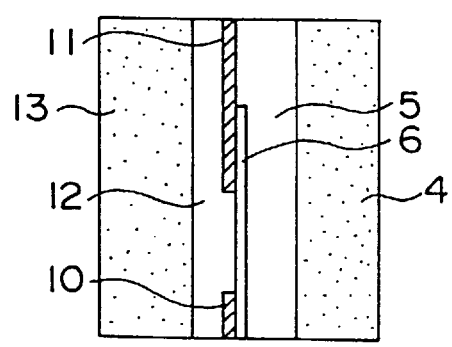
FIG.3C is a sectional view showing the MR head along a line II—II in FIG.3A.

FIGS.3A to 3C show a magnetoresistive head (MR) head according to a first embodiment of the present invention. In FIGS.3A and 3B, a first insulating gap layer 5 formed of $Al_2O_3$, or the like is formed on a first magnetic shielding layer 4 formed of NiFe, FeAlSi, or the like. A rectangular MR layer 6 is formed on the first gap layer 5. By way of example, the MR layer 6 is formed of a soft magnetic layer of a single layer such as NiFe, NiFeCo, or CoFe.

The first and second hard magnetic layers 7, 8 such as CoCrPt or CoCrTa are formed on both sides of the MR layer 6 to control magnetic domains in the MR layer 6.

Magnetizations Mo of the first and second hard magnetic layers 7, 8 are directed in the same direction which is parallel to the magnetic disk 1. The axis of easy magnetization of the MR layer 4 is thus controlled in the direction parallel to the magnetic disk 1. An insulating layer 9 such as $Al_2O_3$ is formed on the hard magnetic layers 7, 8 respectively.

A first electrode 10 and a second electrode 11 made of nonmagnetic conductive material such as gold or tungsten are formed at a distance on the MR layer 6. The first electrode 10 is formed near an opposing surface to the magnetic disk 1 (referred to as an "opposing surface to the magnetic recording medium" hereinafter) and is extended over the insulating layers 9 formed on both sides of the MR layer 6 to the outside. A width of the first electrode 10 in the direction perpendicular to the opposing surface to the magnetic recording medium is wide such as about 0.5 to 1 μm on the first hard magnetic layer 7, while it is narrow such as about 0.1 to 0.5 μm on the second hard magnetic layer 8. The second electrode 11 resides only between the first and second hard magnetic layers 7, 8 and is extended from the MR layer 6 to there on the first gap layer 5. The second electrode 11 is formed narrower than a distance between the first and second hard magnetic layers 7, 8.

Respective edge portions of the first electrode 10 and the second electrode 11 are opposed in parallel to each other on the MR layer 6, and are formed obliquely with respect to the direction of magnetization Mo of the first and second hard magnetic layers 7, 8. For purposes of example, these edge portions are formed to have at angles of 45 degree relative to the direction of the axis of easy magnetization of the magnetoresistive layer 6 and the applied direction of the signal magnetic field Hsig respectively.

As shown in FIG.3C, the MR layer 6, the first and second hard magnetic layers 7, 8, and the first and second electrodes 10, 11 are covered with a second gap layer 12 formed of $Al_2O_3$, or the like. A second magnetic shielding layer 13 made of FeAlSi, NiFe, etc. is formed on the second gap layer 12.

In the MR head, when the direction of magnetization Ml in the sense region of the MR layer 6 being sandwiched by the first and second electrodes 10, 11 is inclined from the axis of easy magnetization by virtue of the signal magnetic field Hsig generated by the magnetic disk 1, electric resistance in the MR layer 6 is varied with the current I which flows obliquely relative to the opposing surface to the magnetic recording medium.

In this case, the first electrode 10 in the MR layer 6 has only one oblique side relative to the opposing surface to the magnetic recording medium. Accordingly, since the sense current I flowing through the sense region of the MR layer 6 is easy to concentrate into the area in the first electrode 10 having a larger width and smaller electric resistance and therefore is difficult to spread in a radial fashion, sensitivity can be improved. In this event, for example, the sense current I flows at angles of 45 degrees relative to the direction of the axis of easy magnetization of the MR layer 6 and the applied direction of the signal magnetic field respectively. It is the reason why the angles are set to 45 degrees that such angles are preferable to increase rate of resistance change, but they are not limited to 45 degrees to provide linear resistance change in response to the change in the signal magnetic field Hsig.

If the first electrode 10 is retained at potential identical to the magnetic recording medium, for example, discharge or short-circuit owing to potential difference between the first electrode 10 and the magnetic disk 1 can be avoided and thus damages of the magnetic head can be prevented.

Figure 4A:
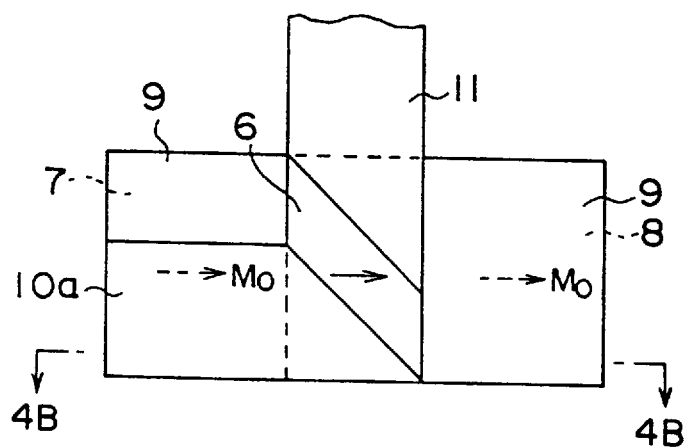
FIG.4A is a plan view showing a variation of first electrodes used in the MR head according to the first embodiment of the present invention.
Figure 4B:
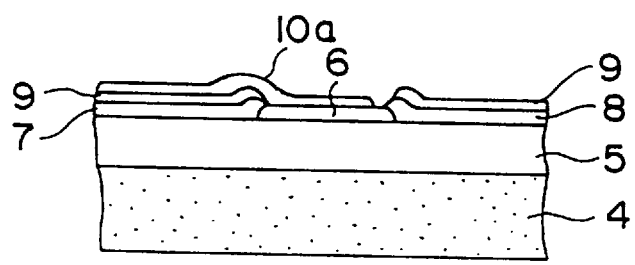
FIG.4B is a sectional view showing the variation of the electrodes along a line III—III in FIG.4A.

Meanwhile, as shown in FIGS.4A and 4B, the first electrode may be formed to be extended only in one direction. If the first electrode 10a is so formed, radial spread of the current flowing from the second electrode 11 to the first electrode 10a can be suppressed further more. Therefore, directionality of the sense current I can be improved to increase sensitivity. In addition, if the second electrode 11 is formed fully longer between the first and second hard magnetic layers 7, 8 in the direction along the opposing surface to the magnetic recording medium, the sense current I is also hard to spread in a radial manner. Therefore, resistance of the second electrode 11 can be reduced.

For instance, potential may be applied to the first electrode 10 or 10a by the following structure.

Figure 5:
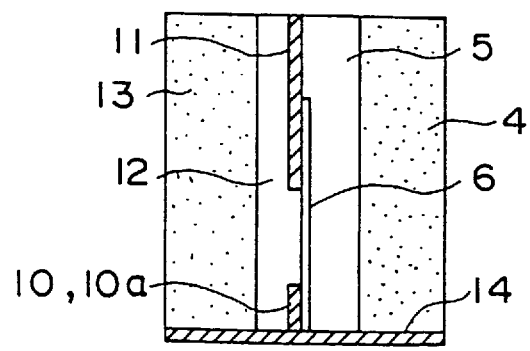
FIG.5 is a sectional view showing a first exemplification of connection between a first electrode and a magnetic shielding layer in the MR head according to the first embodiment of the present invention.

First, as shown in FIG.5, when the opposing surfaces of the first and second magnetic shielding layers 4, 13 and respective layers formed therebetween which are opposed to the magnetic recording medium are covered with a nonmagnetic conductive layer 14 such as tungsten or tantalum, the first electrode 10 or 10a and the first and second magnetic shielding layers 4, 13 are set to the same potential. Since the first and second magnetic shielding layers 4, 13 are as a rule voltage-controlled to have potential identical to the magnetic disk 1, internal wirings for the first electrode 10 or 10a can be neglected. Ground potential may be selected as such potential. The opposing surface to the magnetic recording medium may be called sometimes as an air bearing surface (ABS).

Figure 6:
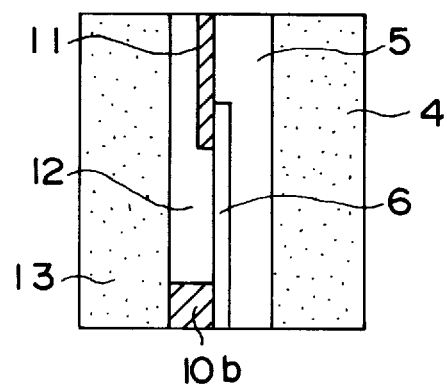
FIG.6 is a sectional view showing a second exemplification of connection between a first electrode and a magnetic shielding layer in the MR head according to the first embodiment of the present invention.
Figure 7:
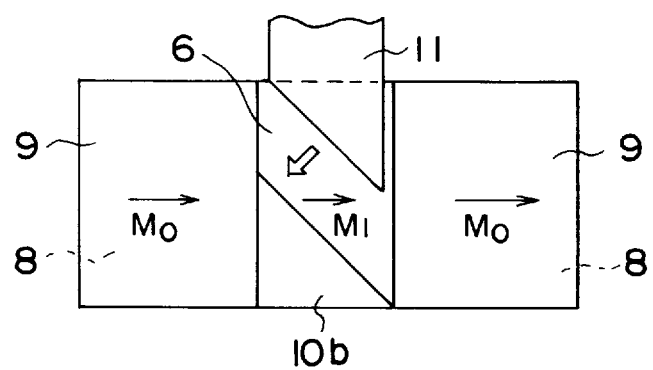
FIG.7 is a plan view showing another variation of the first electrodes used in the MR head according to the first embodiment of the present invention.

As shown in FIG.6, as a structure wherein the first electrode 10 is held at the same potential as the second magnetic shielding layer 11, a thickness of the first electrode 10b may be formed thicker than that of the second electrode 11 and be passed through the second gap layer 12 to contact to the second magnetic shielding layer 13. In this event, as shown in FIG.7, an extension region of the first electrode 10b may be omitted.

Figure 8:
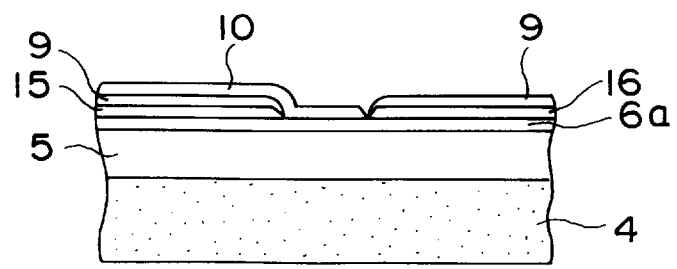
FIG.8 is a sectional view showing a structure wherein an antiferromagnetic layer is used to control magnetic domain in a sense region in the MR head according to the first embodiment of the present invention.

In the above explanation, although the first and second hard magnetic layers 7, 8 have been used with a view to controlling the axis of easy magnetization of the MR layer 6, an antiferromagnetic film such as FeMn, NiMn, or NiO may be employed in place of such layers. In the case of the antiferromagnetic film, as shown in FIG.8, the MR layer 6a is formed widely along an opposing surface to the magnetic disk to form antiferromagnetic layers 15, 16 near both end regions. In case the antiferromagnetic layers 15, 16 are formed of an insulating material such as NiO, an insulating film 9 between the antiferromagnetic layers 15, 16 and the first electrode 10 may be omitted.

Though the case has been explained where the AMR head is applied as the foregoing magnetic head, there are some cases where a spin valve film is used as the MR layer. As the spin valve film, FeMn, NiFe, Cu, and NiFe may be stacked in sequence.

Second Embodiment

In the second embodiment, a structure will be explained wherein the MR head in the first embodiment or the conventional MR head is magnetically shielded.

In general, not only the read only MR head as has been explained in the first embodiment but also inductive type write head is fitted to the rear end of the slider 3 shown in FIG.2.

Figure 9:
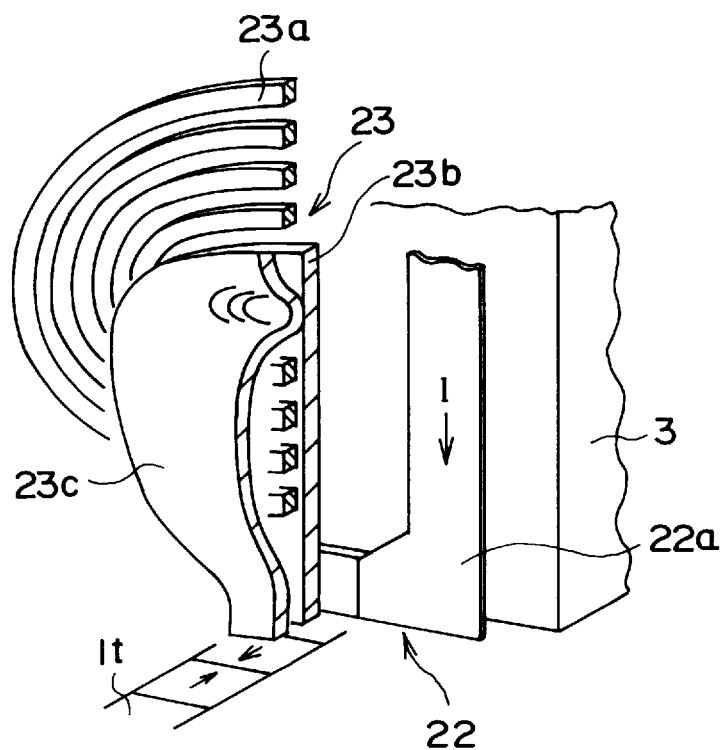
FIG.9 is a perspective view showing an ordinary arrangement of a read magnetic head and a write magnetic head.

As shown in FIG.9, in these magnetic heads, a structure is adopted wherein the MR head 22 and the inductive type head 23 are arranged in order via magnetic shielding layer, insulating layer, etc. on the slider 3. Data are written into the track it of the magnetic disk 1.

Recording/reproducing heads having both the MR head 22 and the inductive type head 23 are classified into shared type and separate type heads in compliance with differences in magnetic shielding of the MR head 22 and in magnetic pole of the inductive type head 23.

Figure 10A:
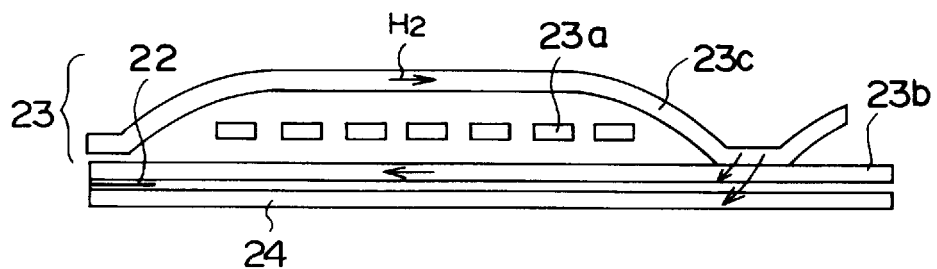
FIG.10A is a sectional view showing the conventional shared type magnetic head.
Figure 10B:
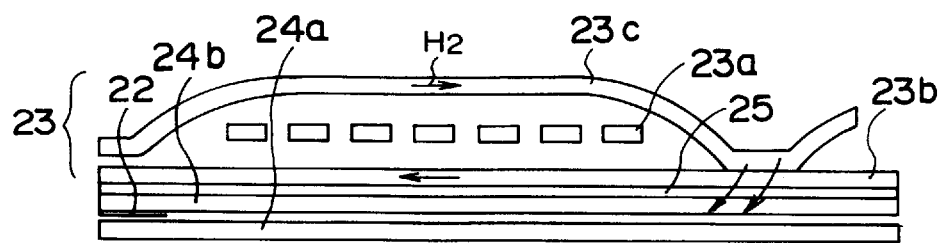
FIG.10B is a sectional view showing the conventional separate type magnetic head.

As shown in FIG.10A, the shared type recording/ reproducing head is so constructed that one of magnetic shielding layers 24 formed to sandwich the MR head 22 therebetween is shared with part of magnetic poles 23b, 23c in the inductive type head 23. As shown in FIG.10B, the separate type recording/reproducing head is so constructed that the magnetic shielding layers 24a, 24b formed to sandwich the MR head 22 therebetween and the magnetic poles 23b, 23c in the inductive type head 23 are formed adjacent to each other via an insulating gap layer 25.

If either one being adopted, a reproducing gap between the magnetic shielding 24, 23b in the MR head 22 and a recording gap between the magnetic poles 23b, 23c in the inductive type head 23 are located at different locations respectively.

If locations of the reproducing gap and the recording gap are differently located, relative locational relationship between recording location and reproducing location is shifted according to the locations of the recording/ reproducing head which are located either at the inside or the outside of the magnetic disk 1. Locational difference between recording location and reproducing location is called as yaw angle loss. Therefore, it is important to reduce the yaw angle loss in the magnetic disk drive having the recording/reproducing head.

The shared type recording/reproducing head has small yaw angle loss, but the magnetic pole 23b is considerably subjected to the recording magnetic field $H_2$ since it is a shared portion with the shielding layer. In other words, since magnetization state of the magnetic pole 23b is varied every time when recording operations are repeated, read outputs of the MR head are affected by such change in magnetization.

On the other hand, it may be considered in the separate type recording/reproducing head that, since the magnetic shielding layers 24a, 24b of the MR head 22 and the magnetic poles 23b, 23c of the inductive type head 23 are provided individually, the magnetic shielding layer 24b is less affected by the recording magnetic field $H_2$. However, if film thicknesses of the magnetic shielding layer 24a of the MR head 22, the magnetic pole 23b of the inductive type head 23, and the gap layer 25 to separate the magnetic shielding layer 24a from the magnetic pole 23b are thinned in order to reduce the yaw angle loss, influence of the write magnetic field on the magnetic shielding layer 24b is increased. As a result, read outputs of the MR head are affected.

Figure 11:
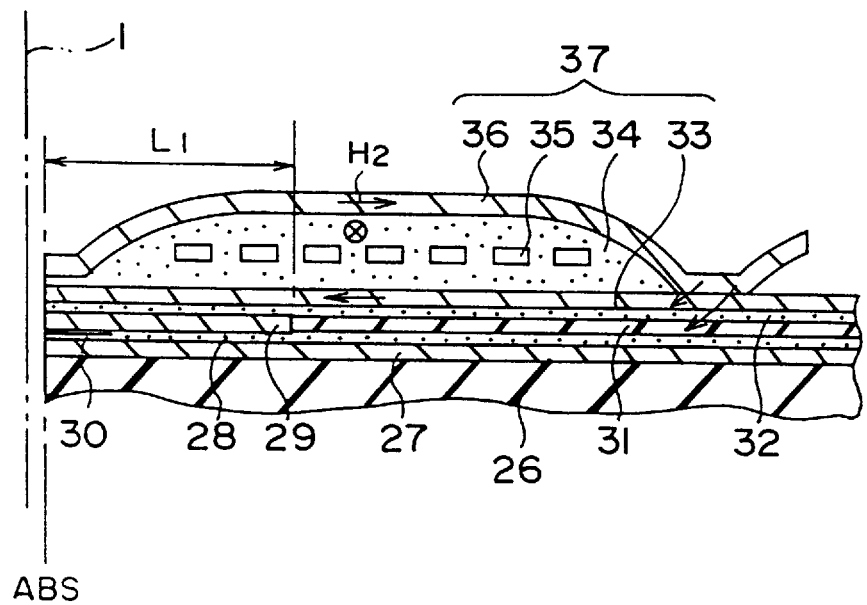
FIG.11 is a sectional view showing a magnetic head according to a second embodiment of the present invention.

Hence, in order to decrease the influence of the recording magnetic field, a structure shown in FIG.11 is employed in the second embodiment of the present invention.

In FIG.11, on a nonmagnetic insulating substrate 26 is formed a first magnetic shielding layer 27 on which a second magnetic shielding layer 29 is formed via a first insulating layer 28 formed of nonmagnetic material such as $Al_2O_3$.

A magnetoresistive device (MR device) 30 is formed in a first insulating layer 28 between the first magnetic shielding layer 27 and the second magnetic shielding layer 29. The MR device 30 is connected to a pair of electrodes (not shown) formed in the first insulating layer 28. The MR device 30 serves as a read only electromagnetic transducer. On ends of the first magnetic shielding layer 27, the second magnetic shielding layer 29, and the MR device 30 are opposed to a recording surface of the magnetic disk 1. Respective lengths of the first magnetic shielding layer 27 and the second magnetic shielding layer 29 from the opposing surface to the magnetic disk (ABS) are formed such that the second magnetic shielding layer 29 is shorter than the first magnetic shielding layer 27. The length of the second magnetic shielding layer 29 is set to at least a larger value than that of the MR device 30, for example, it is set in the range of 5 to 50 $\mu$m.

Since the second magnetic shielding layer 29 is formed by patterning a soft magnetic film, difference in level is caused on the boundary between the second magnetic shielding layer 29 and the first insulating layer 28. This difference in level would cause undulation in the magnetic pole of the inductive type head 37 described later. Therefore, an intermediate layer 31 formed of organic insulating material such as resist, inorganic insulating material such as $Al_2O_3$ or $SiO_2$, or nonmagnetic metal material is formed in a region of the first insulating layer 28 with which the second magnetic shielding layer 29 is not overlapped. The intermediate layer 31 is formed to have a substantially similar thickness to the second magnetic shielding layer 29, e.g., a thickness of 0.5 μm.

A second insulating layer 32 formed of nonmagnetic material is formed on the second magnetic shielding layer 29 and the intermediate layer 31. A thickness of the second insulating layer 32 is formed less than 3 μm on the second magnetic shielding layer 29 with a view to reducing the yaw angle loss.

The inductive type head 37 is formed on the second insulating layer 32 and includes a first magnetic pole 33, a third insulating layer 34, a conductive coil 35, and a second magnetic pole 36.

The first magnetic pole 33 of about 1 μm thickness is formed on the second insulating layer 32. In addition, a length of the first magnetic pole 33 from the opposing surface to the magnetic disk is formed longer than that of the second magnetic shielding layer 29. The third insulating layer 34 and the second magnetic pole 36 are formed on the first magnetic pole 33. A part of the conductive coil 35 is embedded in the third insulating layer 34.

The first magnetic pole 33 and the second magnetic pole 36 are separated mutually at a space of almost 0.1 to 0.6 μm on the opposing surface to the magnetic disk, while they contact each other in the region not to overlap with the second magnetic shielding layer 29. Respective lengths of the first magnetic pole 33 and the second magnetic pole 36 from the opposing surface to the magnetic disk to ends of connecting portions, i.e., yoke lengths, are formed longer than a length L1 of the second magnetic shielding layer 29 along the same direction.

For this reason, there exists no second magnetic shielding layer 29 near the connecting region of the first magnetic pole 33 and the second magnetic pole 36.

The first and second magnetic shielding layers 27, 29 and the first and second magnetic poles 33, 36 are formed of magnetic material such as NiFe.

In the second embodiment, since the second magnetic pole 36 is also curved in the connecting region of the first magnetic pole 33 and the second magnetic pole 36, the recording magnetic field $H_2$ generated from the coil 35 leaks from the connecting region to the MR device 30 side. But magnetic domain structures of the second magnetic shielding layer 29 hardly change due to the leakage magnetic field because no second magnetic shielding layer 29 is formed beneath the connecting region. As a result, since a leakage amount of the signal magnetic field generated from the magnetic disk 1 into the first and second magnetic shielding layers 27, 29 is not changed, a magnitude of the signal magnetic field input into the MR device 30 is not fluctuated with every writing operation of the inductive type head 37, so that the MR device 30 may produce stable outputs.

Conversely, as shown in FIG.10A, in case function of the shielding layer is also provided to the first magnetic pole 23b, magnetic domain structures of the first magnetic pole 23b are changed due to the recording magnetic field $H_2$. Therefore, this is equal to the event that magnetic domains in the shielding are disturbed every writing operation.

Thus, the signal magnetic field leaked from the magnetic disk 1 to the shielding layer 24 and the first magnetic pole 23b are fluctuated upon reading information. As a result, a magnitude of the signal magnetic field input into the MR device 22 is changed significantly every writing operation by the inductive type head 23 to thus cause disturbance of the output value.

As shown in FIG.10B, if the second shielding layer 24b and the first magnetic pole 23b are formed in the same region, magnetic domain structures of the second shielding layer 24b are changed because of leakage of the signal magnetic field $H_2$. Therefore, these magnetic domains are disturbed every writing operation while the signal magnetic field leaked from the magnetic disk 1 to the first and second shielding layers 24a, 24b is varied upon reading. As a result, a magnitude of the signal magnetic field input into the MR device 22 is varied, and this causes disturbance in the output value. Hence, a magnitude of the signal magnetic field input into the MR device 22 is fluctuated every writing, and disturbance in the output value is caused.

Figure 12:
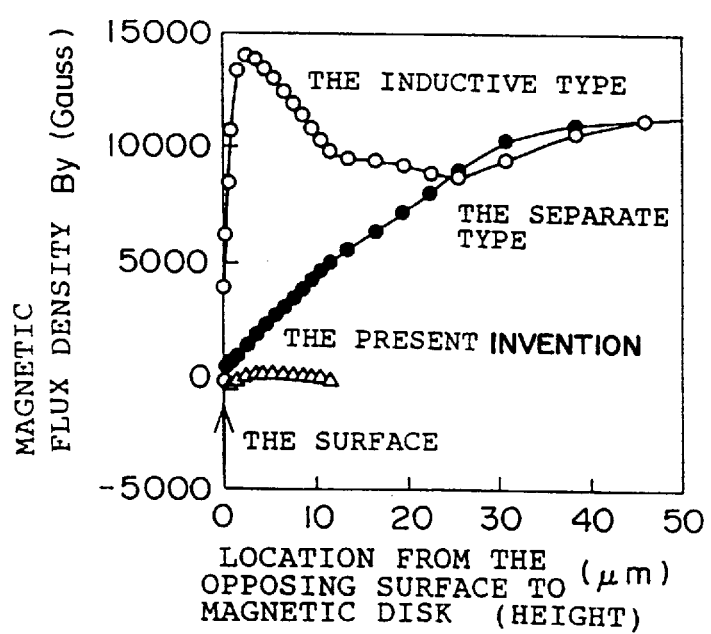
FIG.12 is a graph illustrating saturation magnetic flux density distribution in the magnetic head according to the second embodiment of the present invention and saturation magnetic flux density distribution in the shielding layer the conventional magnetic head.

As with the second magnetic shielding layer 29 in the recording/reproducing head in the second embodiment shown in FIG.11, the first magnetic pole (shielding layer) 23b in the conventional recording/reproducing head shown in FIG.10A, and the second magnetic shielding layer 24b in the conventional recording/reproducing head shown in FIG.10B, the results shown in FIG.12 have been derived when relations between location from the opposing surface to the magnetic disk (height) and saturation magnetic flux density have been examined by flowing the allowable current through the coils 23a, 35.

According to FIG.12, the second magnetic shielding layer 29 of the present invention is scarcely influenced by the leakage magnetic field from the first and second magnetic poles 33, 36 and therefore the magnetic flux density is kept constant, i.e., substantially zero.

On the contrary, in the shared type recording/reproducing head shown in FIG.10A, since the first magnetic pole 23b in the inductive type write head is commonly used as the shielding layer in the MR head 22, a high magnetic field is imposed to the first magnetic pole 23b, i.e., the shielding layer upon writing operation. In particular, a highest magnetic field is imposed near the opposing surface to the magnetic disk. Consequently, the output from the MR layer 22 is easy to be varied.

Further, in the separate type recording/reproducing head shown in FIG.10B, a considerably high magnetic field is imposed directly below the coil 23a. Besides, saturation magnetic flux density is further increased as the location becomes closer to the connecting portion of the first magnetic pole 23b and the second magnetic pole 23c.

Consequently, in both the shared type recording/ reproducing head and the separate type recording/reproducing head, magnetic domain structures in the shielding layer are disturbed in each writing and variation in the read output is readily caused.

Next, in the second embodiment, it may be considered that a length of the first magnetic shielding layer 27 is formed shortly like the second magnetic shielding layer 29, but the first magnetic shielding layer 27 is less susceptible to the leakage magnetic field since it is formed far from the inductive type head 37. Moreover, it is not preferable that the first magnetic shielding layer 27 is formed short. This is because a difference in level is caused at the edge portion, thus the difference in level is also caused in a thin leading terminal 22a connected to the MR device shown in FIG.9 to occur disconnection of wirings, and thus the difference in level caused in the inductive type head 37 is in addition enhanced.

If the structure shown in FIG.11 is employed, disconnection of the leading terminal connected to the MR device 30 can be prevented, and the possibility of the occurencey of undulations in the first and second magnetic poles 33, 36 in the inductive type head 37 can be reduced.

Third Embodiment

It has already been explained that magnetic domains in the magnetic shielding layer are varied due to the recording magnetic field in the recording/reproducing head. Various disadvantages are caused by variation of magnetic domains such that it harmfully affects data read from the MR device and causes fluctuation in the reproducing output.

Figure 13A:
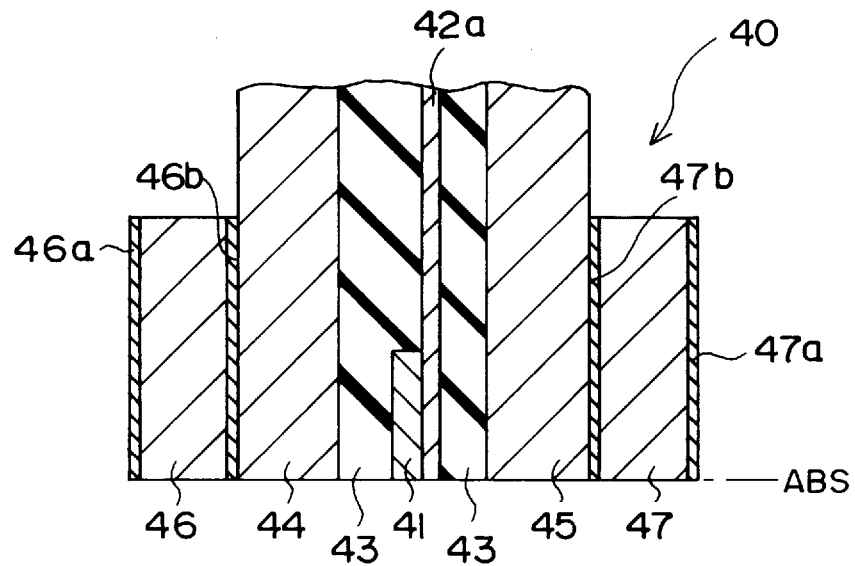
FIG.13A is a sectional view showing a reproducing magnetic head and a pressure applying device according to a third embodiment of the present invention.
Figure 13B:
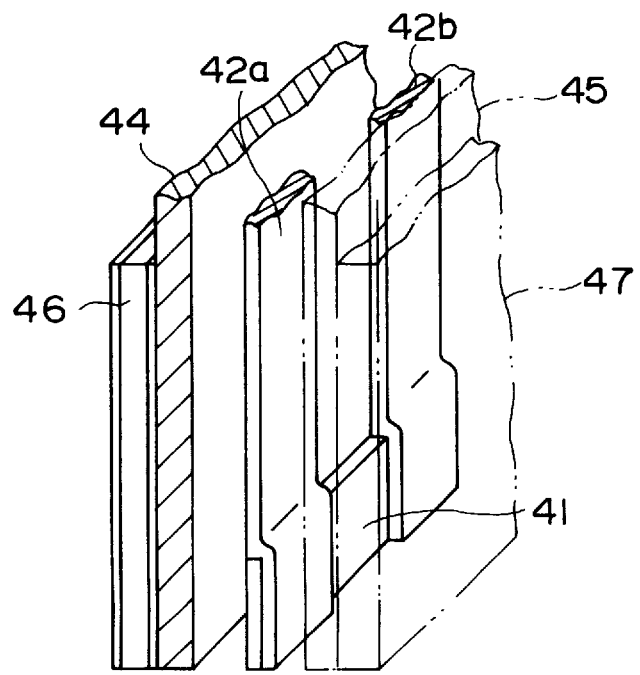
FIG.13B is a perspective view showing the reproducing magnetic head and the pressure applying device in FIG.13A.
Figure 14A:
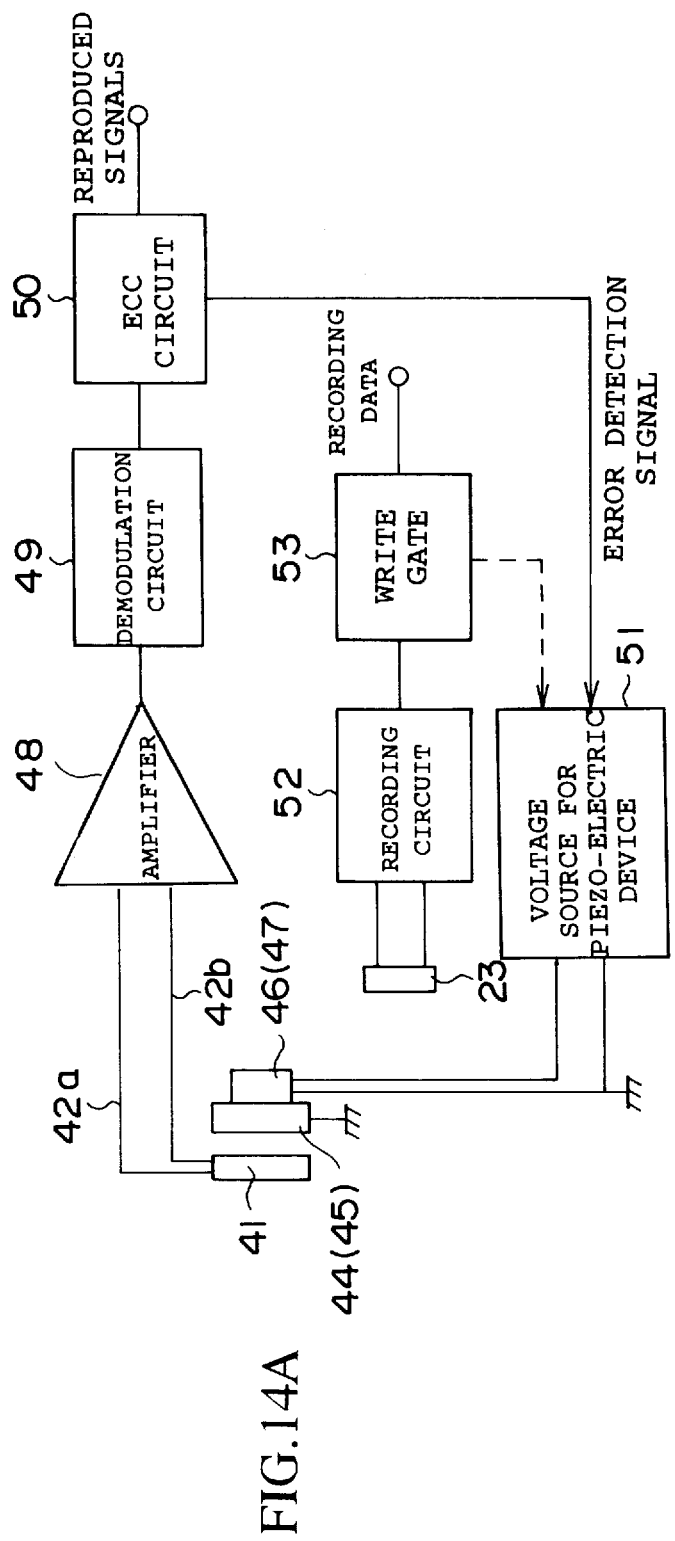
FIG.14A is a block diagram showing a recording/ reproducing circuit and a pressure applying device controlling circuit according to the third embodiment of the present invention.

In order to suppress such variation of magnetic domains, structures shown in FIGS.13A, 13B, and 14A may be employed in addition to the structure proposed in the second embodiment.

In a read only magnetic head 40 shown in FIGS.13A and 13B, to both sides of a magnetoresistive device (MR device) 41 are connected a pair of leading electrodes 42a, 42b which are sandwiched respectively by a first magnetic shielding layer 44 and a second magnetic shielding layer 45 via nonmagnetic insulating layers 43. Piezo-electric devices 46, 47 as pressure applying devices are provided to surfaces of the first magnetic shielding layer 44 and the second magnetic shielding layer 45 which are located far from the MR device 41.

Two pairs of electrodes 46a, 46b and 47a, 47b for applying the voltage are provided to the piezo-electric devices 46, 47. Ground electrodes 46b, 47b are connected to the first magnetic shielding layer 44 and the second magnetic shielding layer 45 formed of nonmagnetic conductive material. For example, there may be considered barium titanate ($BaTiO_3$), lead zirconate ($PbZiO_3$), and lead titanate ($PbTiO_3$) as piezo-electric material for the piezo-electric devices 46, 47.

An inductive type write head 23 shown in FIG.9 is also provided in such read only magnetic head 40.

Subsequently, various signal processing circuits connected to the piezo-electric devices and the magnetic head will be explained with reference to a block diagram in FIG.14A.

Leading electrodes 42a, 42b of the MR device 41 are connected to a demodulation circuit 49 via an amplifier circuit 48. The demodulation circuit 49 is formed to convert analog reproduced signals detected by the MR device 41 to digital signals and then output them to an ECC (Error Check and Correction) circuit 50. The ECC circuit 50 detects errors in the reproduced signal based on waveforms of the reproduced signal, timing, etc. The ECC circuit 50 outputs the reproduced signals as they are when no error is detected, otherwise it outputs an error detection signal to a voltage source for piezoelectric device 51 at the time when errors are generated. When receiving the error detection signal, the voltage source for piezo-electric device 51 outputs predetermined voltage to the piezo-electric devices 46, 47.

Figure 14B:
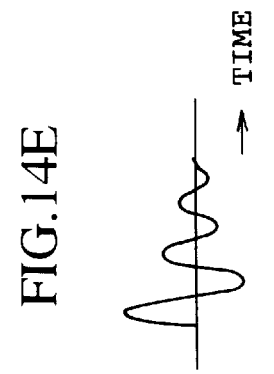
FIGS.14B to 14E are waveform charts illustrating voltage waveforms applied to the pressure applying device.
Figure 14C:
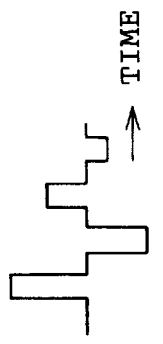
Figure 14D:
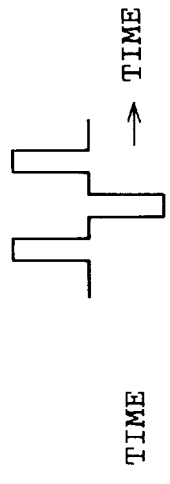
Figure 14E:
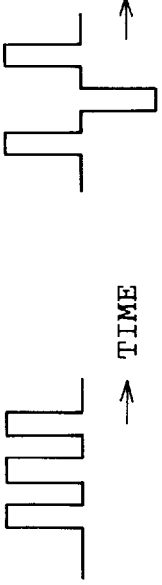

As voltage waveforms applied from the voltage source for piezo-electric device 51 to the piezo-electric devices 46, 47, there are by way of example continuous pulse as shown in FIGS.14B, alternative pulse shown in FIG.14.C, attenuation pulse shown in FIG.14D, and sinusoidal pulse shown in FIG.14E.

The pressure applying device 46, 47 to which such pressure is applied converts the voltage into pressure and then supplies pressure to the first and second magnetic shielding layers 44, 45.

Pressure supplied by the pressure applying device 46, 47 may be applied in either the compressive direction and the tensile direction, or may be applied in both directions alternatively. Further, the pressure applying direction may be selected along the direction opposing the surfaces of the first and second magnetic shielding layers 44, 45 or in the direction perpendicular to the opposing surfaces.

While, in the recording system, the recording magnetic field is applied to the inductive type head 23 via a write gate 52 and a recording circuit 53.

Next, how the pressure generated by the piezo-electric devices 46, 47 affects the first and second magnetic shielding layers 44, 45 will be explained.

Magnetization direction and range of the magnetic domains are varied by the recording magnetic field by the inductive type head 23 in the first and second magnetic shielding layers 44, 45, and sometimes such magnetic domains are not restored to their original stable states to cause internal stress. The first and second magnetic shielding layers 44, 45 having such unstable magnetic domains generate the magnetic field which affects the reading of the MR device 41.

In this state, if the above pressure is applied from the piezo-electric devices 46, 47 to the first and second magnetic shielding layers 44, 45, stresses generated in the first and second magnetic shielding layers 44, 45 are relaxed and thus the magnetic domains return to their original stable states. As a result, an externally generated magnetic field is reduced.

Since constant current flows through the MR device 41, resistance value of the MR device 41 is changed when the signal magnetic field is applied from the magnetic disk 1 shown in FIG.2 to the MR device 41. This change in the resistance value appears as change in the voltage which can be output via the amplifier 48, the demodulation circuit 49, and the ECC circuit 50.

Accordingly, disturbance of the signal magnetic field input into the MR device 41 can be prevented by applying pressure to the first and second magnetic shielding layers 44, 45, so that variation in the reproduced output can be lessened. In order to prevent unstable magnetic fields which are newly generated by the pressure from the piezo-electric devices 46, 47 in the first and second magnetic shielding layers 44, 45, it is desired to apply the voltage having the attenuation waveform shown in FIGS.14D and 14E.

Pressure applying timings by the piezo-electric devices 46, 47 may be set immediately before the reading operation, between writing and the reading operations, or immediately after the writing operation. In order to drive the piezo-electric devices 46, 47 after writing operation, a recording designation signal is input from the write gate 52 to the voltage source for piezo-electric device 51 via a route indicated by a broken line in FIG.14A, and then the voltage is applied from the voltage source for piezo-electric device 51 to the piezo-electric devices 46, 47 at the time when the recording designation signal disappears.

Fourth Embodiment

As has been explained in the prior art column of this text, for instance, a structure consisting of substantially two MR devices and a differential amplifier may be thought about as a means for suppressing thermal asperity in the MR head. In the fourth embodiment, a structure will be explained other than the above structure wherein a device for suppressing resistance change due to temperature is connected to the MR device to suppress thermal asperity.

FIGS. 15A to 15C are a plan view and sectional views showing a magnetoresistive device in a magnetic head according to a fourth embodiment of the present invention. In FIGS. 15A to 15C, a first magnetic shielding layer 56 such as FeAlSi or FeNi is formed on a nonmagnetic insulating substrate 55. A first gap layer 57 made of material having a negative temperature coefficient of resistance is formed on the first magnetic shielding layer 56. As such material having negative temperature coefficient of resistance, there may be considered silicon carbide (SiC), iron oxide, nickel oxide, manganese oxide, molybdenum oxide, copper oxide, etc.

On the first gap layer 57 is formed a magnetoresistive device (MR device) 58 one end of which is exposed from the opposing surface to the magnetic recording medium (ABS). As shown in FIG. 15B, the MR device 58 is made up of a three-layered structure consisting of a SAL (Soft Adjacent Layer) film 58a formed of NiFeCr, a nonmagnetic layer 58b formed of copper, and a magnetoresistive (MR) layer 58c formed of NiFe. Conductive hard magnetic layers 59a, 59b such as CoCrPt or CoCrTa which are magnetized in parallel to a surface of the magnetic recording medium are connected to both sides of the three-layered structure.

The hard magnetic layers 59a, 59b control the direction of free magnetization of the MR devide 58 in no signal magnetic field condition. A pair of terminals 60a, 60b formed of gold or tungsten are extended from upper surfaces of the hard magnetic layers 59a, 59b.

In addition, the terminals 60a, 60b and the MR device 58 are covered with a second gap layer 61 on which a second magnetic shielding layer 62 is formed. Like the first gap layer 57, the second gap layer 61 is made of material having a negative temperature coefficient of resistance. The second magnetic shielding layer 62 is formed of the same material as the first magnetic shielding layer 56.

Figure 16:
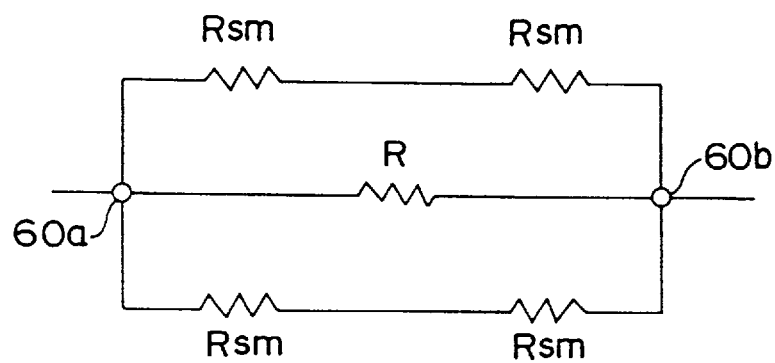
FIG.16 is an equivalent circuit diagram of resistance in the magnetic head according to the fourth embodiment of the present invention.

With the foregoing explanation, the above structure in the MR head is substantially equivalent to a structure wherein NTC (Negative Temperature Coefficient) thermistors each having a negative temperature coefficient of resistance are connected between a pair of terminals 60a, 60b and the first magnetic shielding layer 56 and between a pair of terminals 60a, 60b and the second magnetic shielding layer 62 respectively. Therefore, resistance values Rsm of the thermistors and a resistance value R of the MR device 58 can be regarded as shown in FIG. 16 to be connected in parallel.

Figure 17:
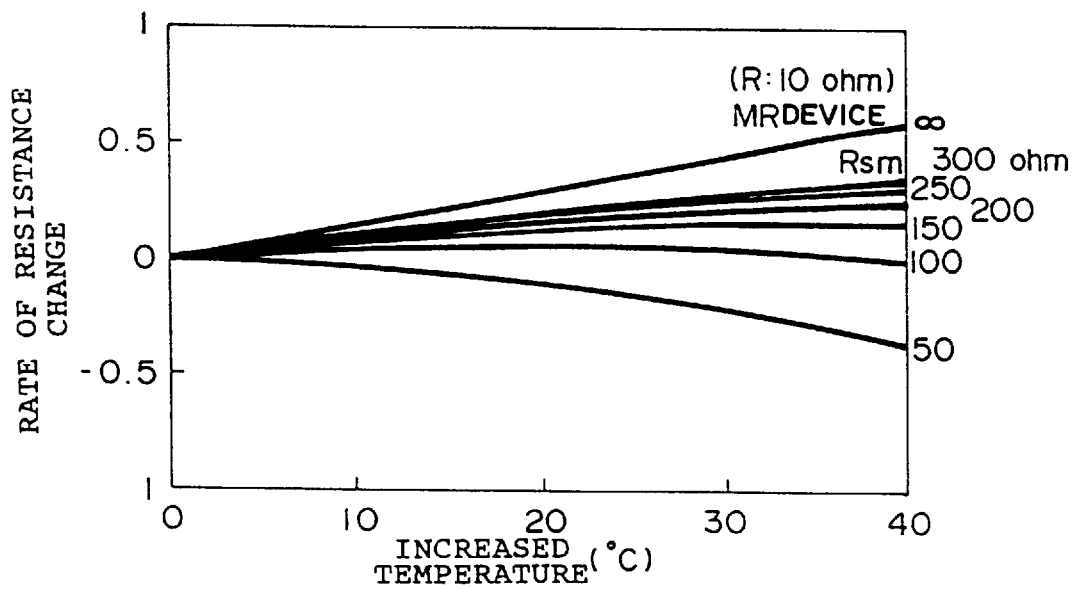
FIG.17 is a graph illustrating relationships between increased temperature and rate of resistance change between terminals in the magnetic head according to the fourth embodiment of the present invention when resistance value of a gap layer having negative temperature coefficient of resistance is varied.

Next, an example is shown in FIG. 17 wherein rate of resistance change between the terminals 60a, 60b because of temperature change can be suppressed with the use of parallel connection of the MR device 58 and the NTC thermistors. In FIG. 17, for the sake of clarity of the suppression effect for the rate of resistance change, the temperature change of the SAL film 58a and the nonmagnetic layer 58b is neglected.

In FIG. 17, assume that the resistance value R of the magnetoresistive layer 58c is 10 $\Omega$, the temperature coefficient of resistance R is 0.15%/° C., SiC formed by sputtering and having the resistance value of 50 to 300 $\Omega$ is used as the first and second gap layers 57, 61, and the temperature coefficient of resistance Rsm is 0.9%/° C.

Figure 18:
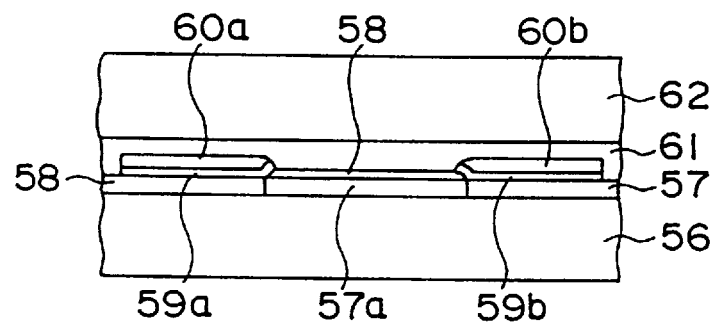
FIG.18 is a sectional view showing an example wherein only a region of the gap layer located beneath the MR device is formed of a material having negative temperature coefficient of resistance in the magnetic head according to the fourth embodiment of the present invention.

As evident from FIG. 18, it can be understood that the resistance value R is increased with the increase in temperature if only the MR layer 58c is considered whereas resistance change between the terminals 60a, 60b due to temperature change can be suppressed if the first and second gap layers 57, 61 serving the NTC thermistor are connected in parallel to the MR layer 58c.

In FIG. 17, in the case of the NTC thermistor having 100 $\Omega$, resistance between the terminals 60a, 60b seldom changes because of temperature change and the best results have been derived.

The resistance values Rsm of the first and second gap layers 57, 61 serving as the thermistors are determined depending upon thicknesses of the first and second gap layers 57, 61, areas of the terminals 60a, 60b or the hard magnetic layers 59a, 59b contacting to the first and second gap layers 57, 61, or resistivity per unit volume of the first and second gap layers 57, 61.

If the first and second gap layers 57, 61 are formed of SiC, their resistance value may be adjusted by introducing an inpurity such as boron, phosphorus, or arsenic. Such impurity may be introduced into only a region between the terminals 60a, 60b and the first and second magnetic shielding layers 56, 62 by ion implantation.

In the magnetic head shown in FIGS. 15A to 15C, although the first and second gap layers 57, 61 formed on and beneath the MR device 58 have been formed of material having a negative temperature coefficient of resistance, one of them may be formed of such material and the other of them may be formed of $Al_{2O3}$ having high resistance.

The resistance of the MR device by thermal asperity is hardly susceptible to an increase in temperature caused in remote regions. Accordingly, as shown in FIG. 18, if only a part of the region of at least one of the first and second gap layers 57, 61 located beneath the MR device 58 may be formed of a layer 57a having negative temperature coefficient of resistance while the remaining region of the first and second gap layers 57, 61 may be formed of $Al_{2O3}$, the change in resistance between the terminals 60a, 60b due to temperature can be suppressed. In the magnetic head shown in FIGS. 15A to 15C, the first and second gap layers 57, 61 have been formed of a material having a negative temperature coefficient of resistance. Therefore, this is equivalent to the state wide areas of the terminals 60a, 60b are connected to the NTC thermistors. However, since thermal asperity is caused by contact heat between the MR device 58 and the magnetic recording medium in the neighboring area of the MR device 58, to connect the NTC thermistors located in other area to the terminals 60a, 60b is ready to decrease precision in temperature compensation.

Figure 19A:
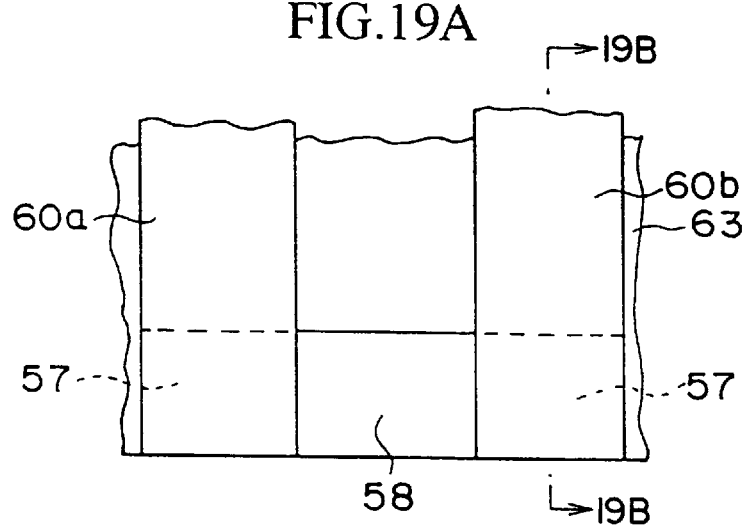
FIG.19A is a plan view showing a structure wherein contact between the gap layer having negative temperature coefficient of resistance and a hard magnetic layer (terminal) is limited only within a region near a surface, which opposes to the magnetic recording medium, of the magnetic head according to the fourth embodiment of the present invention.
Figure 19B:
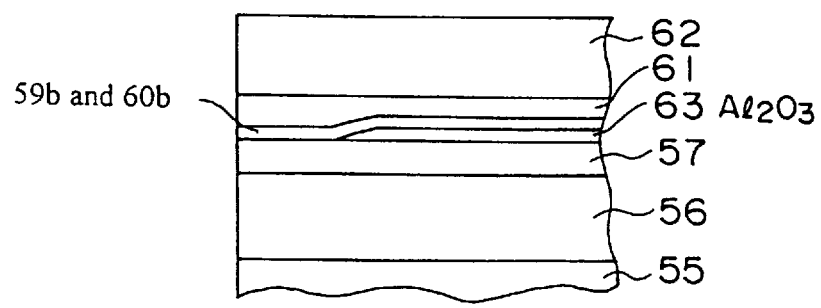
FIG.19B is a sectional view showing the structure in FIG. 19A.

Therefore, as shown in FIGS. 19A and 19B, only a part of the first gap layer 57 located in a region near the opposing surface to the magnetic recording medium is connected to the hard magnetic layers 59a, 59b, but a high resistance insulating layer 63 such as $Al_{2O3}$ may be formed on the first gap layer 57 located in another region. Thereby, this is equivalent to the state wherein only neighboring regions of the MR device 58 are connected to the NTC thermistors. The same structure may be adopted on the second gap layer 61 side.

Figure 20:
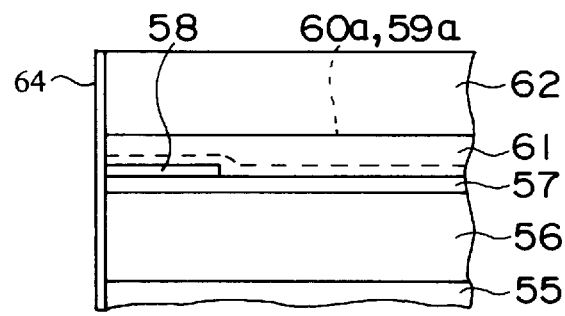
FIG.20 is a sectional view showing a structure wherein a film having negative temperature coefficient of resistance is formed on a surface, which opposes to the magnetic recording medium, of the magnetic head according to the fourth embodiment of the present invention.

In the meanwhile, as shown in FIG. 20, another structure in which a device having a negative temperature coefficient of resistance is connected to the MR device 58 in parallel, a film 64 having a negative temperature coefficient of resistance may be formed on the opposing surface of the MR device 58 to the magnetic recording medium. In this event, a structure may be employed wherein the film 64 is formed in a region including the MR device 58, the first magnetic shielding layer 56 and the second magnetic shielding layer 62, otherwise a structure may be employed wherein the film 64 is formed in a region contacting to the MR device 58 and a pair of the terminals 60a, 60b. The equivalent circuit shown in FIG.16 may also be applied to these structures.

Figure 21:
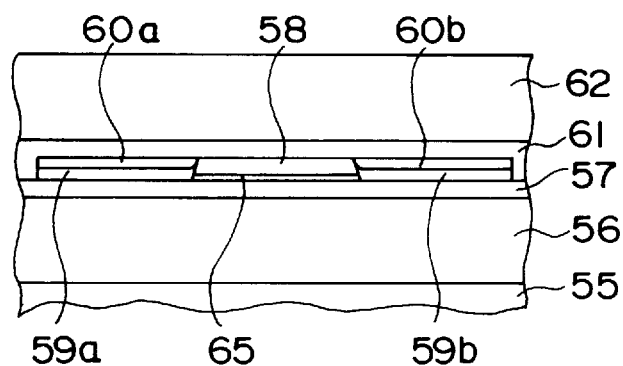
FIG.21 is a sectional view showing a structure wherein a film having negative temperature coefficient of resistance is formed between the gap layer and the MR device in the magnetic head according to the fourth embodiment of the present invention.

As shown in FIG.21, as a structure wherein a device having a negative temperature coefficient of resistance is provided other than the first and second gap layers 57, 61, a thermistor 65 having a negative temperature coefficient of resistance may be formed beneath the MR device 58. In this case, the MR device 58 and the thermistor 65 are connected in parallel to a pair of terminals 60a, 60b.

At any rate, the above MR device 58 has been formed as the AMR device having three-layered structure consisting of the SAL film 58a, the nonmagnetic layer 58b, and the MR layer 58c. However, as shown in FIG.22, a spin valve MR device may be adopted wherein an antiferromagnetic layer 58d formed of FeMn, a pinning layer 58e formed of NiFe, a nonmagnetic conductive layer 58f formed of Cu, and a free soft magnetic layer 58g formed of NiFe are stacked in sequence.

Fifth Embodiment

Figure 22:
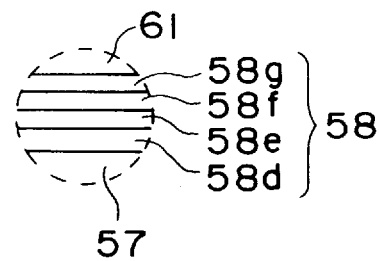
FIG.22 is a sectional view showing a layer structure wherein a spin valve MR device is applied to the magnetic head according to the fourth embodiment of the present invention.

In the fourth embodiment, as shown in FIG.22, as the spin valve MR device, the first structure has been disclosed wherein the antiferromagnetic layer 58d, the pinning layer 58e, the nonmagnetic conductive layer 58f, and the free soft magnetic layer 58g are stacked in order. As another structure, there is a second structure wherein a base layer, a free soft magnetic layer, a nonmagnetic conductive layer, a pinning layer, and an antiferromagnetic layer.

For example, as material of the antiferromagnetic layer, FeNi, NiMn, NiO, or the like may be used.

NiMn and NiO exhibit antiferromagnetism as they are when these films are formed. However, since these film have a lowest temperature Neel point to keep magnetic correlation, they cannot maintain antiferromagnetism if high temperature heating is carried out after the growth of NiMn film and NiO film. On the contrary, as set forth in Patent Application Publication (KOKAI) 6-76247, the magnetic characteristics of NiMn depends considerably on the base layer. For instance, if a Zr film is used, NiMn is inferior in corrosion resistance. Neel temperature of NiMn is about 600° C. and is three times as high as that of FeMn, i.e., 200° C. NiMn is relatively excellent in corrosion resistance.

Figure 23:
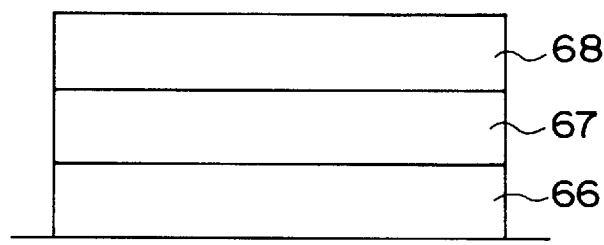
FIG.23 is a sectional view showing a layer structure used in an experiment to examine optimal conditions for a base layer for use in a spin valve magnetic head according to a fifth embodiment of the present invention.

Subsequently, as shown in FIG.23, any of Ti, $Al_2O_3$, Ta, and Zr is used as a base layer 66, and a NiMn film 67 and a NiFe film 68 are formed in order on the base layer 66.

Figure 24:
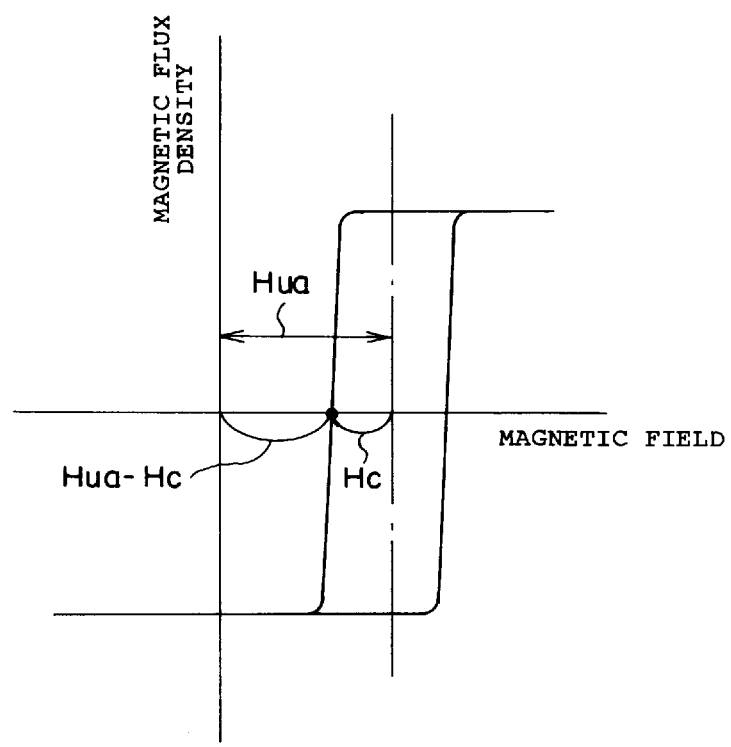
FIG.24 is a characteristic view illustrating a characteristic curve of a magnetic field vs. magnetic flux density of a soft magnetic layer formed on an antiferromagnetic layer.

As shown in FIG.24, when coercive force (Hc) of the NiFe film 67, anisotropic magnetic field (Hua), and magnetization fixing force (Hua-Hc) are investigated by the experiment, the results shown in Table I can be derived. However, in the experiment, a thickness of the base layer 66 is 20 nm, a thickness of the NiMn film 67 is 30 nm and a thickness of the NiFe film 68 is 20 nm.

TABLE I

| kind of base | kind of magnetic field<br>Hc: coercive force<br>Hua: anisotropic magnetic field | magnetic field<br>strength (Oe) |
|---|---|---|
| Ti | Hua | 180 |
|  | Hc | 80 |
|  | Hua-Hc | 100 |
| $Al_2O_3$ | Hua | 123 |

TABLE I-continued

| kind of base | kind of magnetic field<br>Hc: coercive force<br>Hua: anisotropic magnetic field | magnetic field<br>strength (Oe) |
|---|---|---|
|  | Hc | 70 |
|  | Hua-Hc | 53 |
| Ta | Hua | 153 |
|  | Hc | 74 |
|  | Hua-Hc | 79 |
| Zr | Hua | 220 |
|  | Hc | 139 |
|  | Hua-Hc | 81 |

From Table I, it can be seen that, if $Al_2O_3$ or Ta is used as the base layer 66, anisotropic magnetization Hua caused by the NiNn film 67 is small to reduce magnetization fixing force (Hua-Hc) of the NiFe film 68, and the NiFe film 68 lacks stability in magnetization. It can also be seen that, if a Zr film is used as the base layer 66, anisotropic magnetization Hua caused by the NiFe film 68 becomes large due to the NiFe film 67 to exhibit antimagnetism, and coercive force Hc is large, and magnetization fixing force (Hua-Hc) of the NiFe film 68 is small.

Accordingly, it is evident that it is preferable to use Ti as the base layer 66 and use the NiMn film having a high Neel temperature as the antiferromagnetic film. However, it is preferable to carry out a heating step for providing antimagnetism since, because of the high Neel temperature, such heating step results in degradation in a spin valve effect of the free soft magnetic layer and the nonmagnetic conductive layer constituting a spin valve type MR device to lower the output.

Next, a method of manufacturing the spin valve type MR device using Ti and NiMn as material and treated by optimal heating step will be explained hereinbelow.

Figure 25A:
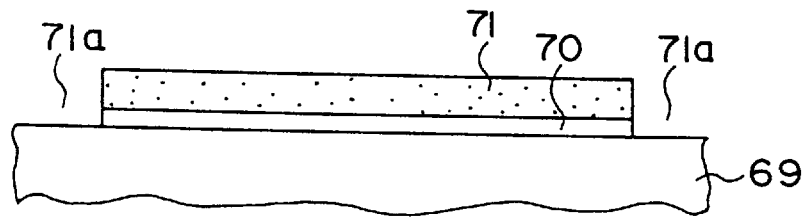
FIGS.25A to 25D are sectional views showing manufacturing steps of forming the spin valve MR device according to the fifth embodiment of the present invention.

First, as shown in FIG.25A, a first magnetic shielding layer 70 of NiFe is formed by plating on a nonmagnetic insulating substrate 69 such as $Al_2O_3$TiC to have a thickness of about 2 μm. Thereafter, the first magnetic shielding layer 70 is patterned by photolithography to have a size of 200×200 μm² covering the MR device forming region and its peripheral area.

After this, a first resist film 71 having windows 71a on both sides of the first magnetic shielding layer 70 is formed. The first resist film 71 is coated by a spin coating and then the windows 71a are formed in the first resist film 71 by baking, exposure, and development processes.

Figure 25B:
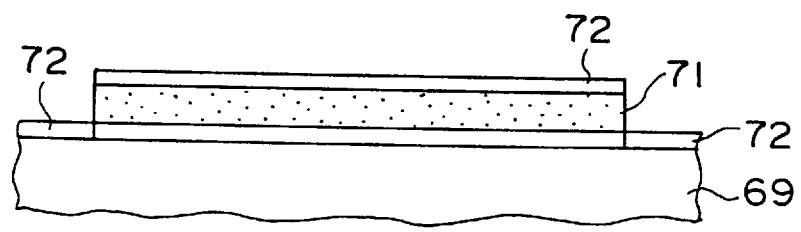

Subsequently, as shown in FIG.25B, a two-layered hard magnetic layer 72 is formed by forming 20 nm thick Cr and 2 μm thick CoCrPt in order by sputtering. The two-layered hard magnetic layer 72 is arranged only on both sides of the first resist film 71 with the use of lift-off method to strip off the first resist film 71. Magnetic shielding layers 70 on both sides of the hard magnetic layer 72 are formed to stabilize magnetization such that magnetic domains in the magnetic shielding layers are not varied considerably because of writing magnetic field.

Figure 25C:
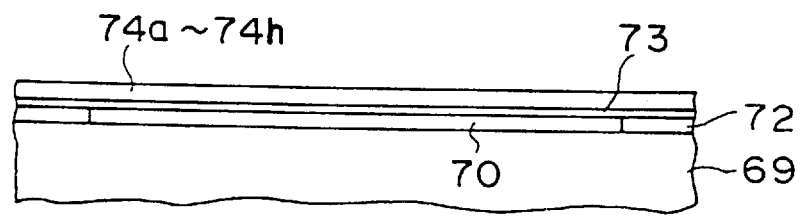
Figure 25D:
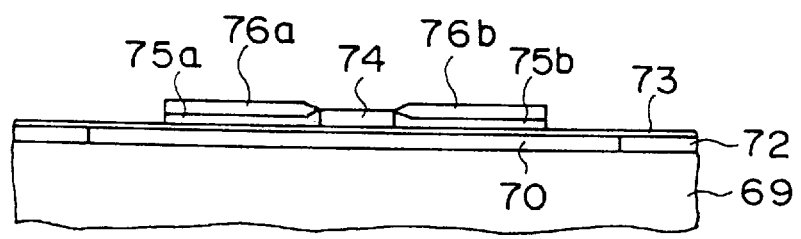

Then, as shown in FIG.25C, $Al_2O_3$ is formed as a first magnetic gap layer 73 on an allover surface to have a thickness of 0.1 μm, and then layers 74a to 74h constituting the spin valve MR device 74 are formed over the magnetic shielding layers 70. Such film forming step and patterning step will be explained hereinbelow.

Figure 26A:
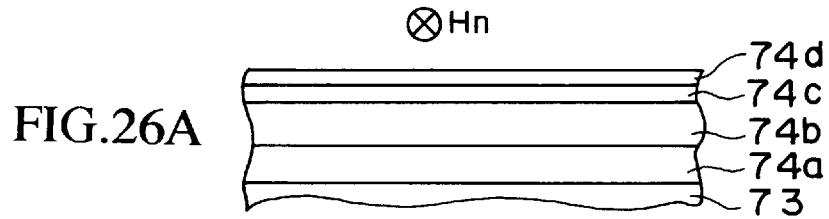
FIGS.26A to 26C are sectional views showing first layer forming steps of the spin valve MR device according to the fifth embodiment of the present invention.

As shown in FIG.26A, in order to form the MR device 74, a 20 nm thick base film 74a of Ti, a 30 nm thick antiferromagnetic film 74b of NiMn, a 5 nm thick first soft magnetic film 74c of CoFe, and a 5 nm thick Ta film 74d are formed in sequence on the first magnetic gap layer 73 by sputtering.

Thereafter, as shown in FIG.26A, annealing is carried out at a temperature of 280° C. for three hours while applying the magnetic field Hn of 2.5 kOe. The direction of the magnetic field Hn is perpendicular to the opposing surface to the magnetic recording medium.

Figure 26B:
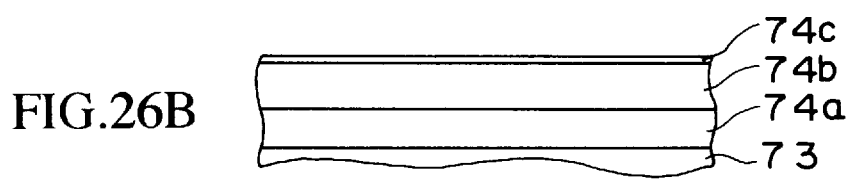

The first soft magnetic film 74c is formed to determine the magnetization direction with the aid of exchange coupling between the NiMn antiferromagnetic film 74b and the first soft magnetic film 74c. The Ta layer 74d is formed to prevent oxidation of the CoFe layer 74c upon annealing. For this reason, as shown in FIG.26B, after completing annealing, the Ta layer 74d is removed by ion milling and the first soft magnetic film 74c is thinned until the film thickness becomes 2 nm.

Figure 26C:
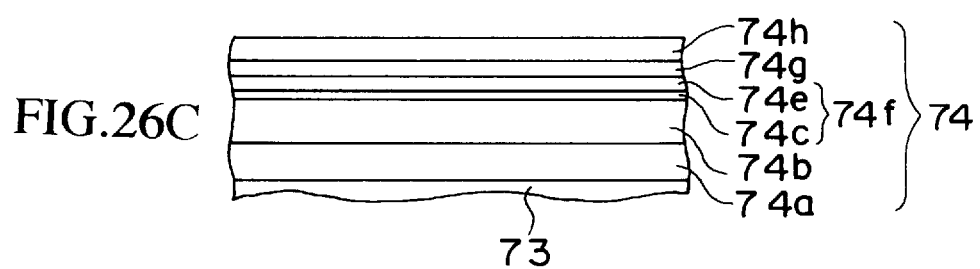

Then, as shown in FIG.26C, a second soft magnetic layer 74e of CoFe or NiFe is grown on the first soft magnetic film 74c to have a thickness of 1 nm. A pinning layer 74f is composed by the first soft magnetic film 74c and the second soft magnetic layer 74e. In addition, a 2.8 nm thick nonmagnetic conductive layer 74g of Cu and a 7.5 nm thick free soft magnetic layer 74h are formed on the pinning layer 74f. The free soft magnetic layer 74h is formed as a two-layered structure wherein 0.5 nm thick CoFe and 7 nm thick NiFe are formed sequentially on the nonmagnetic conductive layer 74g.

Figure 27A:
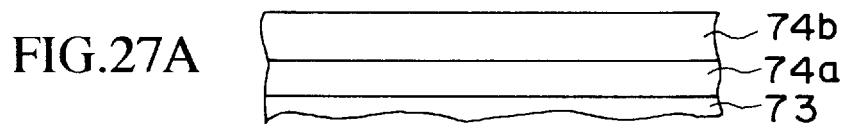
FIGS.27A and 27B are sectional views showing second layer forming steps of the spin valve MR device according to the fifth embodiment of the present invention.
Figure 27B:
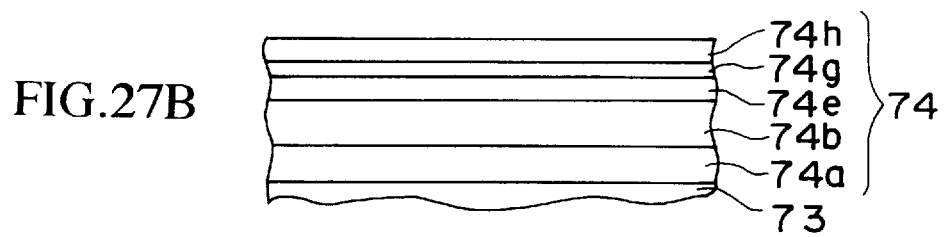

After annealing of the antiferromagnetic film 74b is completed under the condition shown in FIG.26A, as shown in FIG.27A, the first soft magnetic film 74c may be removed perfectly and then the NiMn antiferromagnetic film 74b may be etched up to a depth of about 5 nm. This is because there is no necessity of limiting an end point of etching strictly since the NiMn antiferromagnetic film 74b is formed thick. In this event, as shown in FIG.27B, the second soft magnetic layer 74e formed of CoFe or NiFe is formed on the NiMn antiferromagnetic film 74b to have a thickness of 1 nm. This second soft magnetic layer 74e is used as the pinning layer. Furthermore, a 2.8 nm thick nonmagnetic conductive layer 74g of Cu and a 7.5 nm thick free soft magnetic layer 74h having a two-layered structure consisting of CoFe and NiFe are formed on the second soft magnetic layer 74e.

Meanwhile, as shown in FIG.27A, an anisotropic magnetic field generated by the second soft magnetic layer 74e formed on the antiferromagnetic layer 74b tends to decrease if the first soft magnetic film 74c is removed perfectly. Therefore, it is preferable to adopt steps shown in FIGS.26A to 26C.

Incidentally, NiFe may be used as material of the first soft magnetic film 74c.

Thus, growth steps of the base layer 74a, the antiferromagnetic layer 74b, the pinning layer 74f, the nonmagnetic conductive layer 74g, and the free soft magnetic layer 74h, which constitutes the spin valve MR device 74, are completed and then process proceeds to patterning steps shown in FIGS.28A to 28D.

Figure 28A:
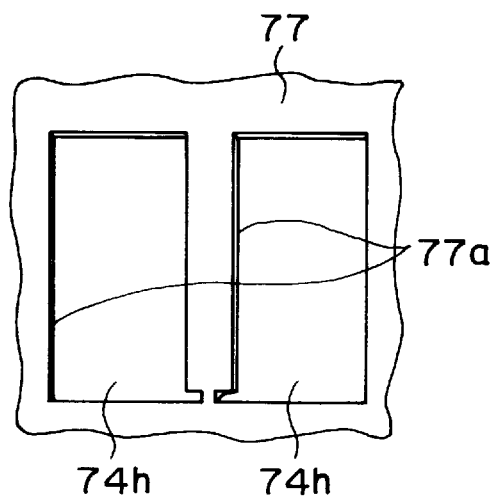
FIGS.28A to 28D are plan views showing patterning steps of the spin valve MR device and the lead terminal according to the fifth embodiment of the present invention.

As shown in FIG.28A, a second resist film 77 which has windows 77a in lead terminal forming regions for the spin valve MR device 74 is formed on the free soft magnetic layer 74h. When layers from the free soft magnetic layer 74h, from which the windows 77a are exposed, to the base layer 74a are removed by ion milling, a first gap layer 73 is exposed from the windows 77a.

Figure 28B:
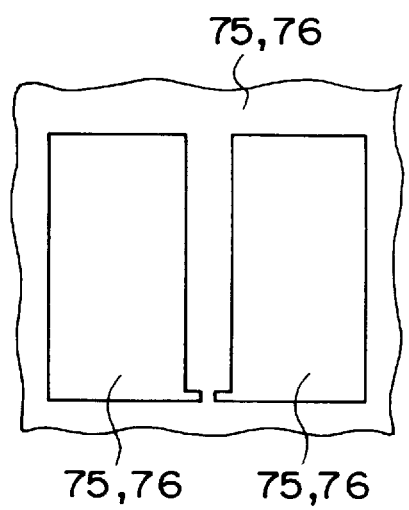

Next, as shown in FIG.28B, a magnetization controlling hard magnetic layer 75 formed of CoCrPtr and having a thickness of 12 nm and a terminal nonmagnetic conductive film 76 formed of Au and having a thickness of 70 nm are formed on the entirety of the resultant structure, and then the hard magnetic layer 75 and the nonmagetic conductive layer 76 are removed by stripping off the second resist film 77 by solvent except for the regions of the windows 77a. Thereby, a pair of leading electrodes 76a, 76b are formed by the nonmagetic conductive layer 76, and a pair of hard magnetic layers 75a, 75b reside therebeneath to direct the magnetization direction of the free soft magnetic layer 74h in parallel to the opposing surface to the magnetic recording medium. Magnetization of the hard magnetic layer 75a, 75b is effected by applying the magnetic field in the middle of layer growth.

Figure 28C:
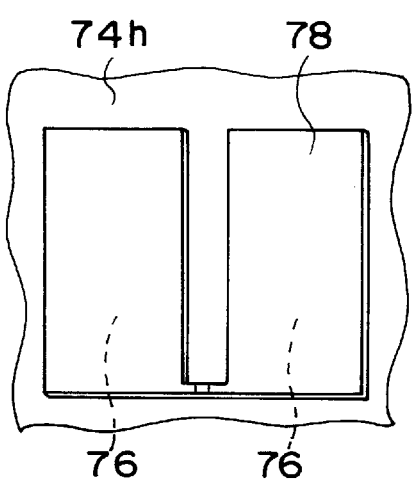
Figure 28D:
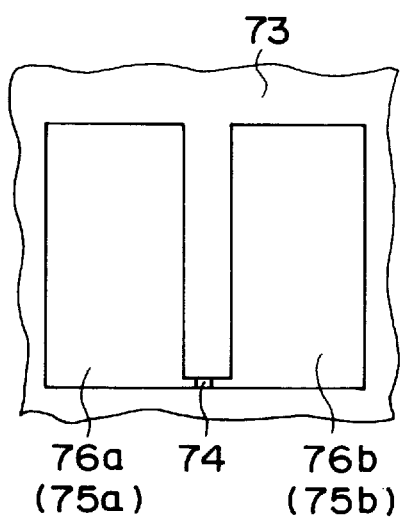
Figure 29:
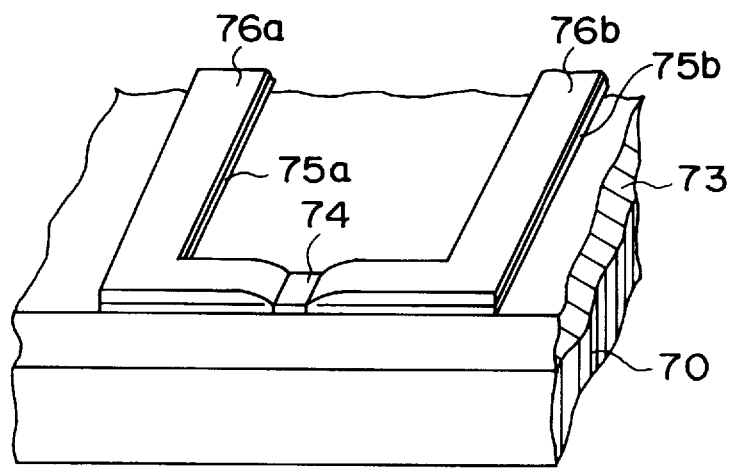
FIG.29 is a perspective view showing the spin valve MR device and the lead terminal according to the fifth embodiment of the present invention.

As shown in FIG.28C, a U-shaped third resist 78 is formed to cover the leading electrodes 76a, 76b and their top ends. When respective layers from the free soft magnetic layer 74h not covered with the third resist 78 to the base layer 74a are etched, as shown in FIG.28.D, respective layers from the free soft magnetic layer 74h to the base layer 74a remain only between top ends of a pair of leading electrodes 76a, 76b. As a result, layer patterns of the MR device 74 are formed.

According to the above steps, patterning of the spin valve MR device 74, the leading electrodes 76a, 76b, and the magnetization controlling hard magnetic layers 75a, 75b are finished. A plan shape of the spin valve MR device 74 is formed to have a size of 2×2 $\mu m^2$.

Figure 30:
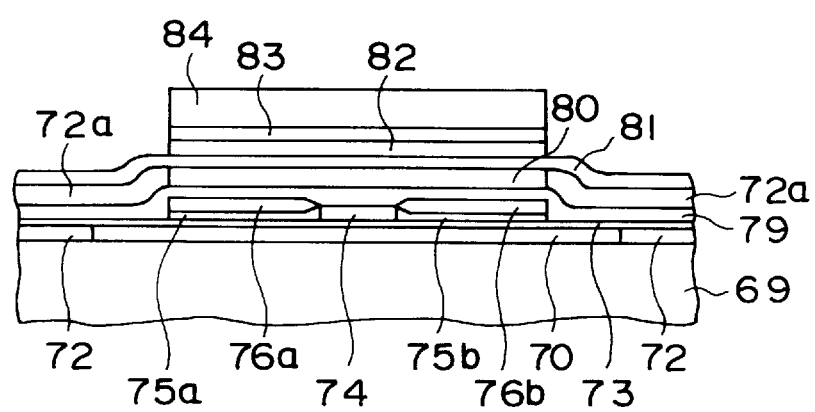
FIG.30 is a side view showing a surface, which opposes to the magnetic recording medium, of the spin valve MR device and the lead terminal according to the fifth embodiment of the present invention.

After this, as shown in FIG.30, a 0.1 $\mu m$ thick second gap layer 79 formed of nonmagnetic insulating material such as $Al_2O_3$ and a 2 $\mu m$ thick second magnetic shielding layer 80 formed of NiFe are formed. The second magnetic shielding layer 80 is patterned to have a shape of 150×150 $\mu m^2$. Thereafter, like the first magnetic shielding layer 70, a hard magnetic layer 72a having a two-layered structure consisting of Cr and CoCrPt is formed on both sides of the second magnetic shielding layer 80. With the above, a read only magnetic head having the spin valve MR device 74 has been formed on the substrate 69, and an inductive type write head which is separated magnetically by a 0.5 $\mu m$ thick $Al_2O_3$ is formed thereon, as shown in FIG.30.

As shown in FIG.31A, in the inductive type write head, a writing gap layer 82 formed of $Al_2O_3$ and having a thickness of 0.5 $\mu m$ is formed on a lower magnetic pole 81 to assure a write gap gp, then a copper coil 85 is formed in a nonmagnetic insulating layer 86 thereon, and then an upper magnetic pole 84 having a thickness of 2 $\mu m$ is formed on the insulating layer 86. The upper magnetic pole 84 is connected to the lower magnetic pole 81 in the central area of the coil 85.

As shown in FIG.31B, formation of the coil 85 is carried out by patterning a 2 $\mu m$ thick copper film formed by plating on the writing gap layer 82 into a coil shape with the use of photolithography.

An insulating layer 86 covering the coil 85 is formed of organic material such as resist or polyamide. As shown in FIG.31C, a peripheral portion of the insulating layer 86 is rounded by heating after the insulating layer 86 is patterned. Such heating is conducted at a temperature not to degrade the spin valve effect of the spin valve MR device 74.

However, such a disadvantage is caused by such heating that crystal anisotropy of the first and second magnetic shielding layers 70, 80 is reduced so that reproduced waveforms lack stability. Hence, if the hard magnetic layers 72, 72a formed on both sides of the first and second magnetic shielding layers 70, 80 are magnetized by applying an external magnetic field H3 upon heating, magnetic anisotropy of the first and second magnetic shielding layers 70, 80 formed of NiFe is enhanced by the magnetic field generated externally from the hard magnetic layers 72, 72a, which leads to increase in stability of the reproduced waveforms.

The external magnetic field H3 is applied in the perpendicular direction to the opposing surface to the magnetic recording medium (ABS).

Incidentally, in the drawings of this embodiment, a condition is shown for easy understanding where the opposing surface to the magnetic recording medium is formed. But in practice, after all films being formed, such opposing surface to the magnetic recording medium is formed by cutting when the substrate 6 is cut off.

What is claimed is:

1. A magnetoresistive head for reading/writing data on a magnetic recording medium, comprising;

a magnetoresistive layer;

a pair of magnetization direction controlling layers, arranged on opposite sides of said magnetoresistive layer, said pair of magnetization controlling layers for setting the axis of easy magnetization of said magnetoresistive layer parallel to a magnetic recording surface of said magnetic recording medium, said pair of magnetization controlling layers defining therebetween a sense region for allowing a sense current to flow into said sense region;

a first electrode formed near said sense region, said first electrode including a first edge which is substantially parallel to said magnetic recording surface and an oblique edge which is oblique to said magnetic recording surface; and a second electrode formed on one end of said magnetoresistive layer, said second electrode having a second edge which is substantially parallel to, and spaced apart from, said oblique edge of said first electrode, wherein said magnetoresistive head is configured and arranged to allow said sense current to only flow substantially between said oblique edge of said first electrode and said second edge of said second electrode.

2. A magnetoresistive head of claim 1, wherein said oblique edge of said first electrode is formed at a substantially 45 degree angle relative to said axis of easy magnetization.

3. A magnetoresistive head of claim 1, further comprising a first shielding layer and a second shielding layer, wherein said magnetoresistive layer, said first electrode, and said second electrode are all located between said first shielding layer and said second shielding layer.

4. A magnetoresistive head of claim 3, wherein said first electrode is conductively connected to at least one of either said first shielding layer or said second shielding layer.

5. A magnetoresistive head of claim 3, further comprising a first insulating film positioned on said first shielding layer and a second insulating film positioned on said second shielding layer, wherein said first electrode extends through said second insulating film to contact said second shielding layer.

6. A magnetoresistive head of claim 3, further comprising a conductive film formed in a region from said first edge of said first electrode to at least one of said first shielding layer or said second shielding layer.

7. A magnetoresistive head of claim 1, wherein said magnetoresistive layer is formed as a single layer structure formed of soft magnetic material.

8. A magnetoresistive head of claim 1, wherein said magnetoresistive layer is made of a spin valve magnetoresistive film.

9. A magnetoresistive head of claim 1, wherein said pair of magnetization direction controlling layers are each made of either a pair of hard magnetic films or a pair of antiferromagnetic films, which are formed so as to put said sense region of said magnetoresistive layer therebetween.

10. A magnetoresistive head of claim 8, wherein said second electrode is formed to have a width narrower than that of a space between said pair of magnetization controlling layers.

11. A magnetic recording apparatus comprising:

a magnetic recording medium;

a magnetoresistive head partially facing said recording medium, said magnetoresistive head including a magnetoresistive layer, a magnetoresistive layer;

a pair of magnetization direction controlling layers, arranged on opposite sides of said magnetoresistive layer, said pair of magnetization controlling layers for setting the axis of easy magnetization of said magnetoresistive layer parallel to a magnetic recording surface of said magnetic recording medium, said pair of magnetization controlling layers defining therebetween a sense region for allowing a sense current to flow into said sense region;

a first electrode formed near said sense region said first electrode including a first edge which is substantially parallel to said magnetic recording surface and an oblique edge which is oblique to said magnetic recording surface;

a second electrode formed on one end of said magnetoresistive layer, said second electrode having a second edge which is substantially parallel to, and spaced apart from, said oblique edge of said first electrode, wherein said magnetoresistive head is configured and arranged to allow said sense current to only flow substantially between said oblique edge of said first electrode and said second edge of said second electrode;

a slider for mounting thereon said magnetoresistive head; and a suspension arm for supporting said slider.

12. A magnetic recording apparatus of claim 11, wherein said first electrode of said magnetoresistive head is set to identical potential to a surface of said magnetic recording medium.

* * * * *

UNITED STATES PATENT AND TRADEMARK OFFICE
CERTIFICATE OF CORRECTION

PATENT NO. : 5,771,141  Page 1 of 2
DATED : June 23, 1998
INVENTOR(S) : Ohtsuka et al.

It is certified that error appears in the above-identified patent and that said Letters Patent is hereby corrected as shown below:

Column 5, line 46, start a new paragraph after "invention"

Column 7, line 59, delete "it" and insert --It-- therefor

Column 14, line 35, after "having" insert --a--

Column 14, line 37, delete "$Al_{2o3}$" and insert --$Al_2O_3$-- therefor

UNITED STATES PATENT AND TRADEMARK OFFICE
CERTIFICATE OF CORRECTION

PATENT NO. : 5,771,141
DATED : June 23, 1998
INVENTOR(S) : Ohtsuka et al.

It is certified that error appears in the above-identified patent and that said Letters Patent is hereby corrected as shown below:

Column 14, line 39, start a new paragraph after "suppressed."

Column 14, line 54, delete "$Al_{2o3}$" and insert --$Al_2O_3$-- therefor

Signed and Sealed this

Twelfth Day of January, 1999

Attest:

Attesting Officer

Acting Commissioner of Patents and Trademarks